United States Patent
Mullins

(10) Patent No.: US 10,147,239 B2
(45) Date of Patent: Dec. 4, 2018

(54) CONTENT CREATION TOOL

(71) Applicant: DAQRI, LLC, Los Angeles, CA (US)

(72) Inventor: Brian Mullins, Altadena, CA (US)

(73) Assignee: DAQRI, LLC, Los Angeles, CA (US)

(*) Notice: Subject to any disclaimer, the term of this patent is extended or adjusted under 35 U.S.C. 154(b) by 29 days.

(21) Appl. No.: 15/617,951

(22) Filed: Jun. 8, 2017

(65) Prior Publication Data

US 2017/0323486 A1 Nov. 9, 2017

Related U.S. Application Data

(63) Continuation of application No. 15/041,395, filed on Feb. 11, 2016, now Pat. No. 9,679,416, which is a continuation of application No. 13/840,048, filed on Mar. 15, 2013, now Pat. No. 9,262,865.

(51) Int. Cl.
G06T 11/00 (2006.01)
G06T 13/20 (2011.01)
G06T 19/00 (2011.01)

(52) U.S. Cl.
CPC .......... G06T 19/006 (2013.01); G06T 11/001 (2013.01); G06T 13/20 (2013.01)

(58) Field of Classification Search
CPC ...... G06T 19/006; G06T 13/20; G06T 11/001
See application file for complete search history.

(56) References Cited

U.S. PATENT DOCUMENTS

| 9,262,865 B2 | 2/2016 | Mullins |
| 9,679,416 B2 | 6/2017 | Mullins et al. |
| 2010/0302143 A1 | 12/2010 | Spivack |
| 2011/0219339 A1* | 9/2011 | Densham ............... G06T 15/00 715/849 |
| 2012/0122570 A1* | 5/2012 | Baronoff ............... A63F 13/655 463/31 |
| 2012/0135784 A1 | 5/2012 | Lee et al. |
| 2012/0299961 A1 | 11/2012 | Ramkumar et al. |

(Continued)

FOREIGN PATENT DOCUMENTS

| AU | 2014235427 B2 | 7/2016 |
| JP | 2012095261 A | 5/2012 |

(Continued)

OTHER PUBLICATIONS

"U.S. Appl. No. 13/840,048, Examiner Interview Summary dated Sep. 4, 2015", 3 pgs.

(Continued)

Primary Examiner — Maurice L. McDowell, Jr.
Assistant Examiner — Donna J. Ricks
(74) Attorney, Agent, or Firm — Schwegman Lundberg & Woessner, P.A.

(57) ABSTRACT

A server for content creation is described. A content creation tool of the server receives, from a first device, a content identifier of a physical object, a virtual object content, and a selection of a template corresponding to an interactive feature for the virtual object content. The content creation tool generates a content dataset based on the content identifier of the physical object, the virtual object content, and the selected template. The content creation tool provides the content dataset to a second device, the second device configured to display the interactive feature corresponding to the selected template.

20 Claims, 21 Drawing Sheets

(56) References Cited

U.S. PATENT DOCUMENTS

| | | | |
|---|---|---|---|
| 2012/0314043 A1 | 12/2012 | Jung et al. | |
| 2012/0327119 A1* | 12/2012 | Woo | G06F 17/30029 345/633 |
| 2013/0044128 A1 | 2/2013 | Liu et al. | |
| 2013/0278633 A1* | 10/2013 | Ahn | G06T 19/006 345/633 |
| 2013/0335303 A1* | 12/2013 | Maciocci | G06F 3/011 345/8 |
| 2013/0342564 A1* | 12/2013 | Kinnebrew | G09G 3/003 345/619 |
| 2014/0063063 A1* | 3/2014 | Scott | G06T 11/60 345/633 |
| 2014/0247278 A1* | 9/2014 | Samara | G06T 11/00 345/633 |
| 2014/0267406 A1 | 9/2014 | Mullins | |
| 2015/0026785 A1* | 1/2015 | Soon-Shiong | G06Q 30/0207 726/7 |
| 2015/0052479 A1* | 2/2015 | Ooi | G06F 3/04815 715/810 |
| 2016/0163111 A1 | 6/2016 | Mullins | |

FOREIGN PATENT DOCUMENTS

| | | |
|---|---|---|
| JP | 2012165276 A | 8/2012 |
| JP | 2013026922 A | 2/2013 |
| KR | 1020120040350 A | 4/2012 |
| KR | 1020120133648 A | 12/2012 |
| WO | WO-2014150980 A1 | 9/2014 |

OTHER PUBLICATIONS

"U.S. Appl. No. 13/840,048, Non Final Office Action dated May 19, 2015", 28 pgs.
"U.S. Appl. No. 13/840,048, Notice of Allowance dated Dec. 17, 2015", 13 pgs.
"U.S. Appl. No. 13/840,048, Response filed Aug. 31, 2015 to Non Final Office Action dated May 19, 2015", 14 pgs.
"U.S. Appl. No. 15/041,395, Non Final Office Action dated Jun. 28, 2016", 23 pgs.
"U.S. Appl. No. 15/041,395, Notice of Allowability dated Mar. 10, 2017", 2 pgs.
"U.S. Appl. No. 15/041,395, Notice of Allowance dated Feb. 10, 2017", 8 pgs.
"U.S. Appl. No. 15/041,395, Response filed Oct. 24, 2016 to Non-Final Office Action dated Jun. 28, 2016", 9 pgs.
"U.S. Appl. No. 15/041,395, Preliminary Amendment filed Feb. 18, 2016", 5 pgs.
"Australian Application Serial No. 2014235427, First Examiner Report dated Feb. 25, 2016", 2 pgs.
"Australian Application Serial No. 2014235427, Response filed Jun. 17, 2016 to First Examiner Report dated Feb. 25, 2016", 8 pgs.
"European Application Serial No. 14770112.2, Extended European Search Report dated Jun. 22, 2016", 8 pgs.
"European Application Serial No. 14770112.2, Response filed Jan. 23, 2017 to Extended European Search Report dated Jun. 22, 2016", 14 pgs.
"International Application Serial No. PCT/US2014/024698, International Preliminary Report on Patentability dated Sep. 24, 2015", 7 pgs.
"International Application Serial No. PCT/US2014/024698, International Search Report dated Jul. 24, 2014", 3 pgs.
"International Application Serial No. PCT/US2014/024698, Written Opinion dated Jul. 24, 2014", 5 pgs.
"Japanese Application Serial No. 2016-501608, Office Action dated Jun. 7, 2016", w/ English Translation, 4 pgs.
"Japanese Application Serial No. 2016-501608, Response filed Aug. 24, 2016 to Office Action dated Jun. 7, 2016", w/ English Translation, 13 pgs.
"Korean Application Serial No. 10-2015-7029881, Office Action dated May 31, 2016", w/ English Translation, 6 pgs.
"Korean Application Serial No. 10-2015-7029881, Office Action dated Oct. 18, 2016", w/ English Translation, 5 pgs.
"Korean Application Serial No. 10-2015-7029881, Response filed Aug. 1, 2016 to Office Action dated May 31, 2016", w/ English Claims, 21 pgs.
"Korean Application Serial No. 10-2015-7029881, Response filed Dec. 14, 2016 to Office Action dated Oct. 18, 2016", w/ English Translation, 13 pgs.
"New Zealand Application Serial No. 713294, First Examiner Report dated Jun. 2, 2016", 2 pgs.
Rekimoto, J, "Matrix: a realtime object identification and registration method for augmented reality", Computer Human Interaction, Proceedings 3rd Asia Pacific, IEEE, (Jul. 15-17, 1998), 63-68.
Uchiyama, H., et al., "Deformable random dot markers", Mixed and Augmented Reality (ISMAR), 2011 10th IEEE International Symposium, (Oct. 26-29, 2011), 237-238.

* cited by examiner

Options:
There are currently two 'X-Ray Specs' Templates to choose from:

- 'X-Ray Specs 2D' for flat Images
- 'X-Ray Specs 3D' for 3d models

5. And then move their device to the left to view the unique details on the other side.

CONTENT CREATION TOOL

REFERENCE TO RELATED APPLICATIONS

This application is a continuation of and claims the benefit of priority to U.S. application Ser. No. 15/041,395, filed Feb. 11, 2016, which is a continuation of and claims the benefit of priority to U.S. application Ser. No. 13/840,048, filed Mar. 15, 2013, which is hereby incorporated by reference in its entirety.

TECHNICAL FIELD

The subject matter disclosed herein generally relates to the processing of data. Specifically, the present disclosure addresses systems and methods that involve a content creation tool.

BACKGROUND

A device can be used to generate additional data based on an image captured with the device. For example, augmented reality (AR) may provide a live, direct or indirect, view of a physical, real-world environment whose elements are augmented by computer-generated sensory input such as sound, video, graphics, or GPS data. With the help of advanced AR technology (e.g. adding computer vision and object recognition) the information about the surrounding real world of the user becomes interactive. Artificial information about the environment and its objects can be overlaid on a depiction of the real world.

However, developing the artificial information along with guidelines on how the artificial information is to be viewed (e.g., viewed using an application executing on a device) may require extensive coding. As such, content providers who are not well versed in coding may be discouraged from contributing such artificial information.

BRIEF DESCRIPTION OF THE DRAWINGS

Some embodiments are illustrated by way of example and not limitation in the figures of the accompanying drawings.

DETAILED DESCRIPTION

Figure 1:
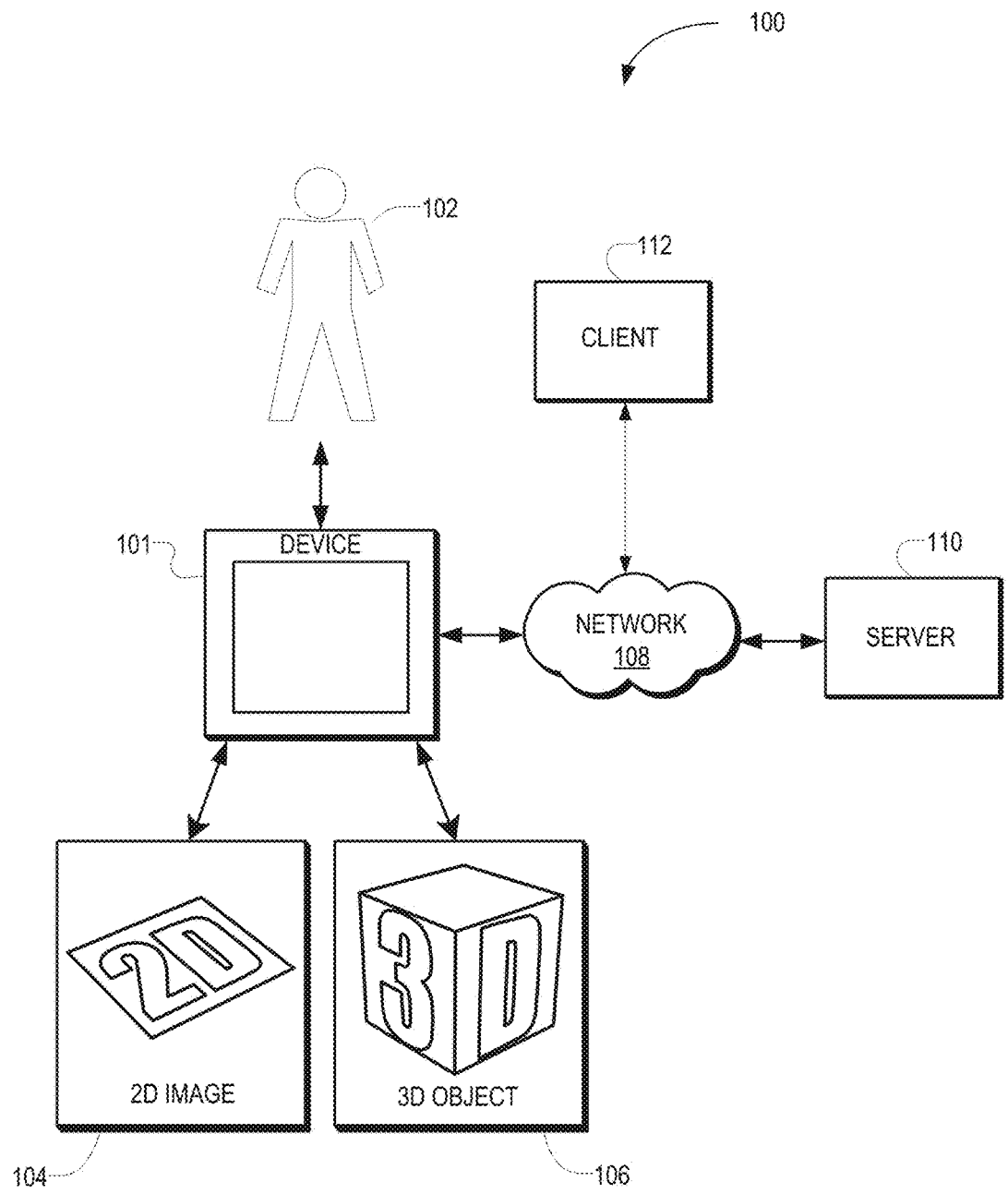
FIG. 1 is a block diagram illustrating an example of a network suitable for operating a content creation tool, according to some example embodiments.

Example methods and systems are directed to a content creation tool. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A server for content creation is described. A content creation tool of the server generates an experience content dataset by using a template to process a content identifier (e.g., a picture on a physical magazine) and virtual object content (e.g., an interactive three-dimensional object with animation). An experience generator of the server provides the experience content dataset to a device that recognizes the content identifier, to generate, at the device, an interactive experience with the virtual object content associated with the content identifier. The device may include an "augmented reality application" to generate the interactive experience.

Augmented reality applications allow a user to experience additional information, such as in the form of a three-dimensional virtual object overlaid on a picture of a physical object captured by a camera of a device. The physical object may include a visual reference (also referred to as a content identifier) that the augmented reality application can identify and recognize. A visualization of the additional information, such as the three-dimensional virtual object engaged with an image of the physical object is generated in a display of the device. The three-dimensional virtual object may be based on the recognized visual reference. A rendering of the visualization of the three-dimensional virtual object may be based on a position of the display relative to the visual reference.

In one embodiment, the content creation tool uses a template to gather content information from a content creator (e.g., a user at a client). For example, the template may be used to collect, from the content creator, a two-dimensional image or a three-dimensional object model to be used as the content identifier. The template may also be used to collect, from the content creator, a two-dimensional or three-dimensional virtual object model for the virtual object content. In another embodiment, the template allows for the content creator to select from stock (or already provided) two-dimensional or three-dimensional virtual object models for the virtual object content. The content creation tool may associate the content identifier with the virtual object content to generate the experience content dataset.

In one embodiment, the content creation tool may convert a first format of the content identifier to a second format of the content identifier to accommodate different layouts and third party system connections. For example, a two-dimensional picture may be converted to a thumbnail size for menu presentation or a large format for layout presentation. Furthermore, the content creation tool may generate a mathematical hash of the content identifier to be used to track a recognized content identifier with the device.

In one embodiment, the content creation tool can also determine a characteristic of the virtual object content and generate a presentation of an interactive feature related to the characteristic of the virtual object at the device. For example, the content creation tool can automatically generate a red button labeled "open door" for a red car with a "door open" animation. The red button when triggered plays the "door open" animation for the red car.

In another embodiment, the server may also generate analytics results based on analytics data received from the device. The analytics results may be provided to the content creation tool to generate an enhanced experience content dataset based on the analytics results. For example, the experience at the device may be customized based on the user device usage history, which picture and which part of the picture the user used the device to point at, a length time corresponding to the part of the picture the device was pointed at, and so forth.

FIG. 1 is a network diagram illustrating a network environment 100 suitable for operating an augmented reality application of a device, according to some example embodiments. The network environment 100 includes a device 101, a client 112, and a server 110, communicatively coupled to each other via a network 108. The device 101, the client 112, and the server 110 may each be implemented in a computer system, in whole or in part, as described below with respect to FIG. 13.

The server 110 may be part of a network-based system. For example, the network-based system may be or includes a cloud-based server system that provides a content creation tool for creating an experience content dataset. The client 112 may access the content creation tool in the server 110 via a web-browser or a programmatic client.

A user 102 may use the device 101 to experience an interactive content generated by the experience content dataset generated by the server 110. In another example, the user 102 may use the client 112 to use the content creation tool of the server 110 to generate the interactive content on the device 101. The user may be a human user (e.g., a human being), a machine user (e.g., a computer configured by a software program to interact with the device 101), or any suitable combination thereof (e.g., a human assisted by a machine or a machine supervised by a human). The user 102 is not part of the network environment 100, but is associated with the device 101 and may be a user of the device 101. For example, the device 101 may be a desktop computer, a vehicle computer, a tablet computer, a navigational device, a portable media device, or a smart phone belonging to the user 102.

The user 102 may be a user of an application in the device 101. The application may include an augmented reality application configured to provide the user 102 with an experience that may be triggered with a physical object such as, a two-dimensional physical object 104 (e.g., a picture) or a three-dimensional physical object 106 (e.g., a car). For example, the user 102 may point a lens of the device 101 to capture an image of the two-dimensional physical object 104. The image is recognized locally in the device 101 using a local context recognition dataset module of the augmented reality application of the device 101. The augmented reality application then generates additional information (e.g., an interactive three-dimensional model) and presents the additional information in a display of the device 101, in response to identifying the recognized image. If the captured image is not recognized locally at the device 101, the device 101 downloads the three-dimensional model corresponding to the captured image, from a database of the server 110 over the network 108.

The device 101 may capture and submit analytics data to the server 110 for further analysis on usage and how the user 102 is engaged with the physical object. For example, the analytics data may include where in particular on the physical or virtual object the user 102 has looked at, how long the user 102 has looked at each location on the physical or virtual object, how the user 102 held the device 101 when looking at the physical or virtual object, which features of the virtual object the user 102 interacted with (e.g., such as whether a user tapped on a link in the virtual object), or any suitable combination thereof. The analytics data may be processed at the server 110 to generate an enhanced content dataset or modified content dataset based on an analysis of the analytics data. The device 101 may receive and generate a virtual object with additional or enhanced features or a new experience based on the enhanced content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
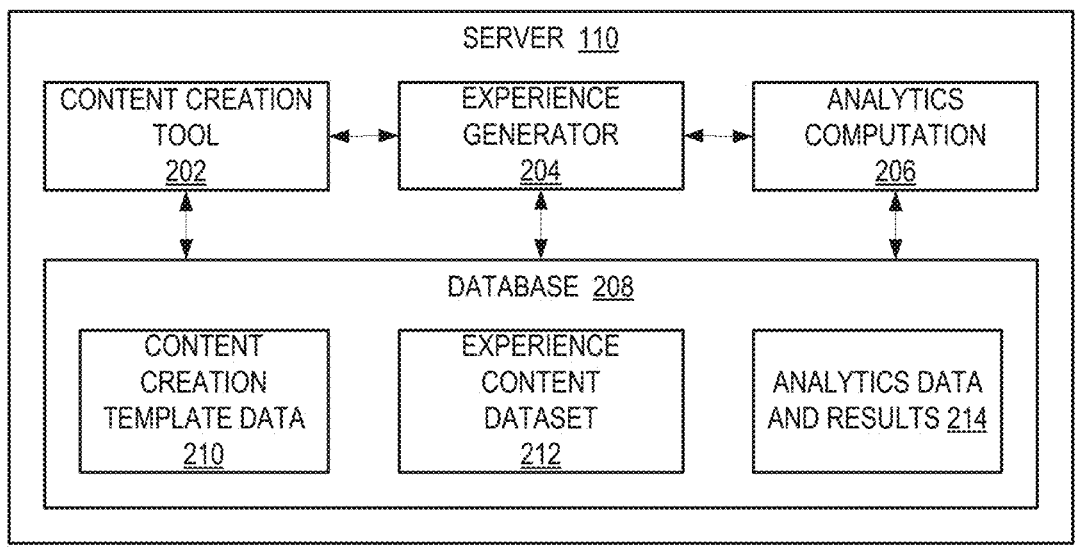
FIG. 2 is a block diagram illustrating modules (e.g., components) of a server, according to some example embodiments.

FIG. 2 is a block diagram illustrating modules (e.g., components) of a server, according to some example embodiments. The server 110 includes a content creation tool 202, an experience generator 204, an analytics computation module 206, and a database 208 in a storage device.

The content creation tool 202 may generate an experience content dataset using a template to process a content identifier and virtual object content received or selected from the client 112. The content creation 202 is described in more detail below with respect to FIG. 3.

The experience generator 204 may provide the experience content dataset to the device 101 that recognizes the content identifier, and generate an interactive experience with the virtual object content at the device 101. In one embodiment, the experience generator 204 generates a virtual object model using the experience content dataset to be rendered in a display of the device 101 based on a position of the device 101 relative to a physical object, such as the two-dimensional physical object 104 (e.g., a picture) or the three-dimensional physical object 106 (e.g., a car). The device 101 recognizes the two-dimensional physical object 104 (e.g., a picture) or the three-dimensional physical object 106 (e.g., a car) as a content identifier. The visualization of the virtual object may correspond to the virtual object model engaged with a real-time image of the physical object captured with the device 101. The virtual object model may be based on an image of the physical object.

The analytics computation module 206 may operate on analytics data received from the device 101 to generate analytics results, and to provide the analytics results to the content creation tool 202 so that the content creation tool 202 can generate a different experience content dataset based on the analytics results. For example, an additional animation or feature may be provided and associated with a location most often viewed by the user. In another example, personalized information may be provided in a presentation of the virtual content (e.g., a virtual billboard) with scores or statistics of the user's favorite sports teams.

In one embodiment, the analytics computation module 206 analyzes a pose estimation of the device 101 relative to the physical object captured with the device 101, a pose duration of the device 101 relative to the physical object captured with the device 101, a pose orientation of the device relative to the physical object captured with the device 101, a pose interaction of the device relative to the physical object captured with the device 101, or any suitable combination thereof. The pose estimation may include a location on the physical or virtual object aimed by the device 101. The pose duration may include a time duration within which the device 101 is aimed at a same location on the physical or virtual object. The pose orientation may include an orientation of the device 101 aimed at the physical or virtual object. The pose interaction may include interactions of the user on the device 101 with respect the virtual object corresponding to the physical object at which the device 101 is aimed.

The database 208 may include content creation template data 210, experience content dataset 212, and analytics and results data 214.

The content creation template data 210 may include the two-dimensional image or three-dimensional object model for the content identifier received from the device 101 via the template, the two-dimensional or three-dimensional virtual object model for the virtual object content received from the device 101 via the template. The content creation template data 210 may include other contents received from other devices and third party systems. For example, the content creation template data 210 may include stock images and three-dimensional animation models from which a user at the device 101 may select.

The experience content dataset 212 may include datasets generated based on the content creation template data 210 using the content creation tool 202. For example, the datasets may include a table of interactive virtual contents and corresponding physical contents.

The analytics and results data 214 may include analytics data received from devices (e.g., device 101). For example, the analytics data may include pose estimation data, pose duration data, pose orientation data, pose interaction data, sentiment data, among others. The analytics and results data 214 may include results data from an analysis of the analytics data with the analytics computation module 206. Results data may include most often used features or most often looked at location of a virtual content generated from one of the experience content dataset 212.

Figure 3:
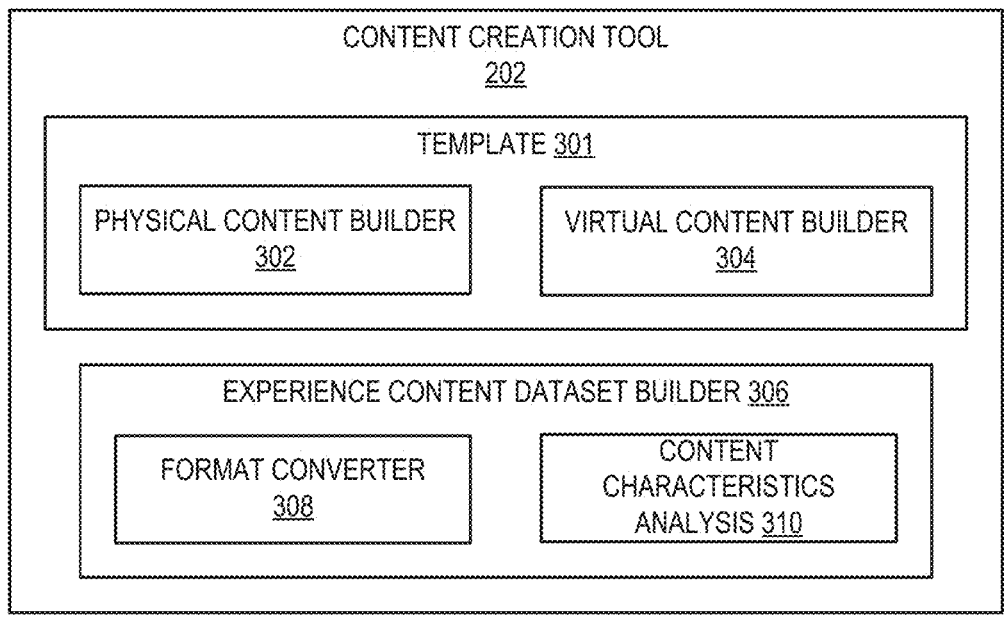
FIG. 3 is a block diagram illustrating modules (e.g., components) of a content creation tool, according to some example embodiments.

FIG. 3 is a block diagram illustrating modules (e.g., components) of the content creation tool 202, according to some example embodiments. The content creation tool 202 may include a template 301 and an experience content dataset builder 206. The template 301 may be used to enable the user 102 at the client 112 to easily create an experience for the device 101 by providing the user with a choice of different preconfigured interaction templates. For example, FIGS. 14-19 illustrate unique experiences generated for each template.

Figure 14:
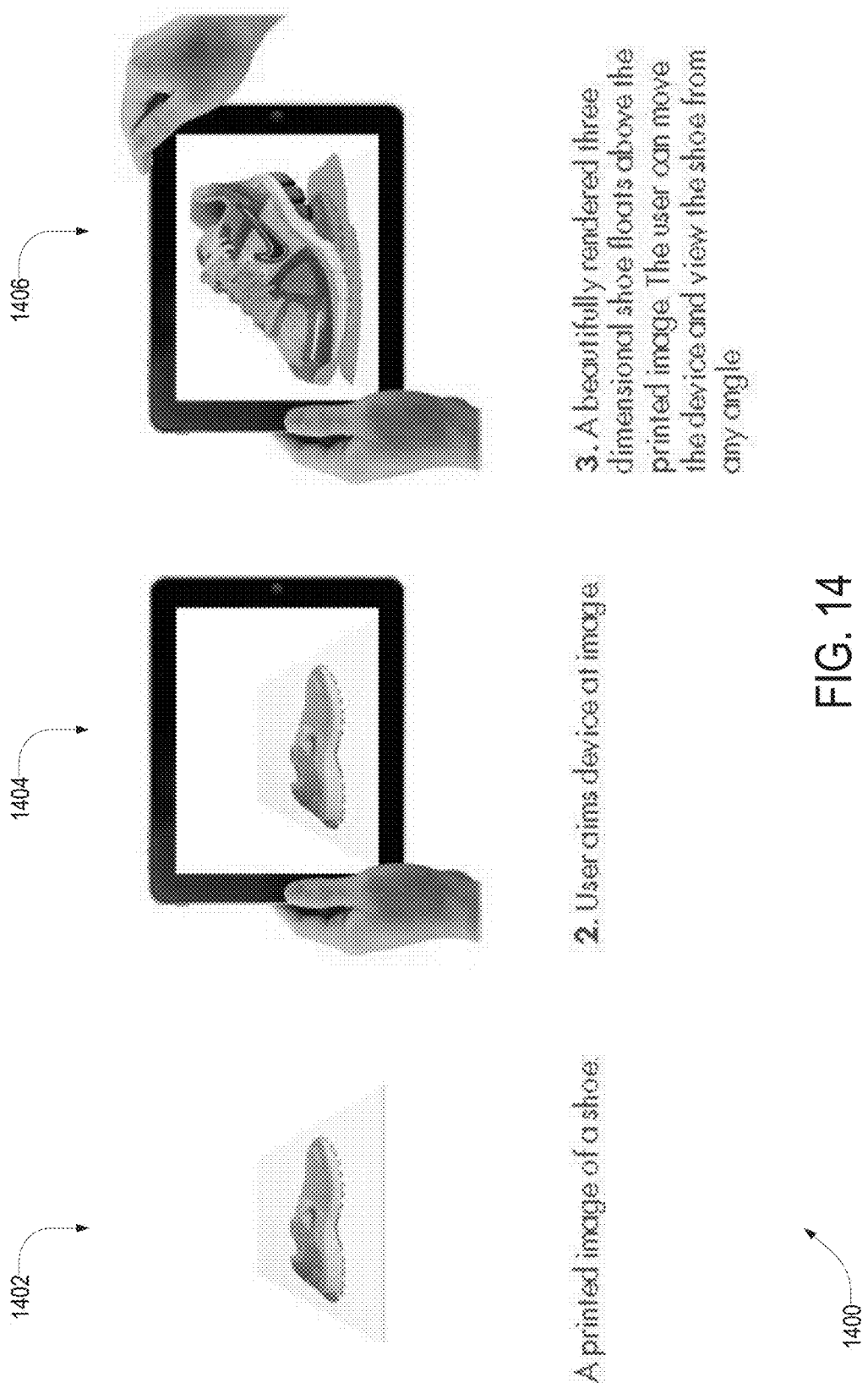
FIG. 14 is a diagram illustrating an example embodiment of a content generated using a template.

FIG. 14 illustrates an example of a content generated using a "floating object" (e.g., shoe) template 1400. At 1402, a printed image of a shoe is provided. At 1404, the user aims a device at the image of the shoe. At 1406, a rendered three dimensional model of the shoe is generated about the printed image. The user can move the device and view the shoe from any angle.

Figure 15:
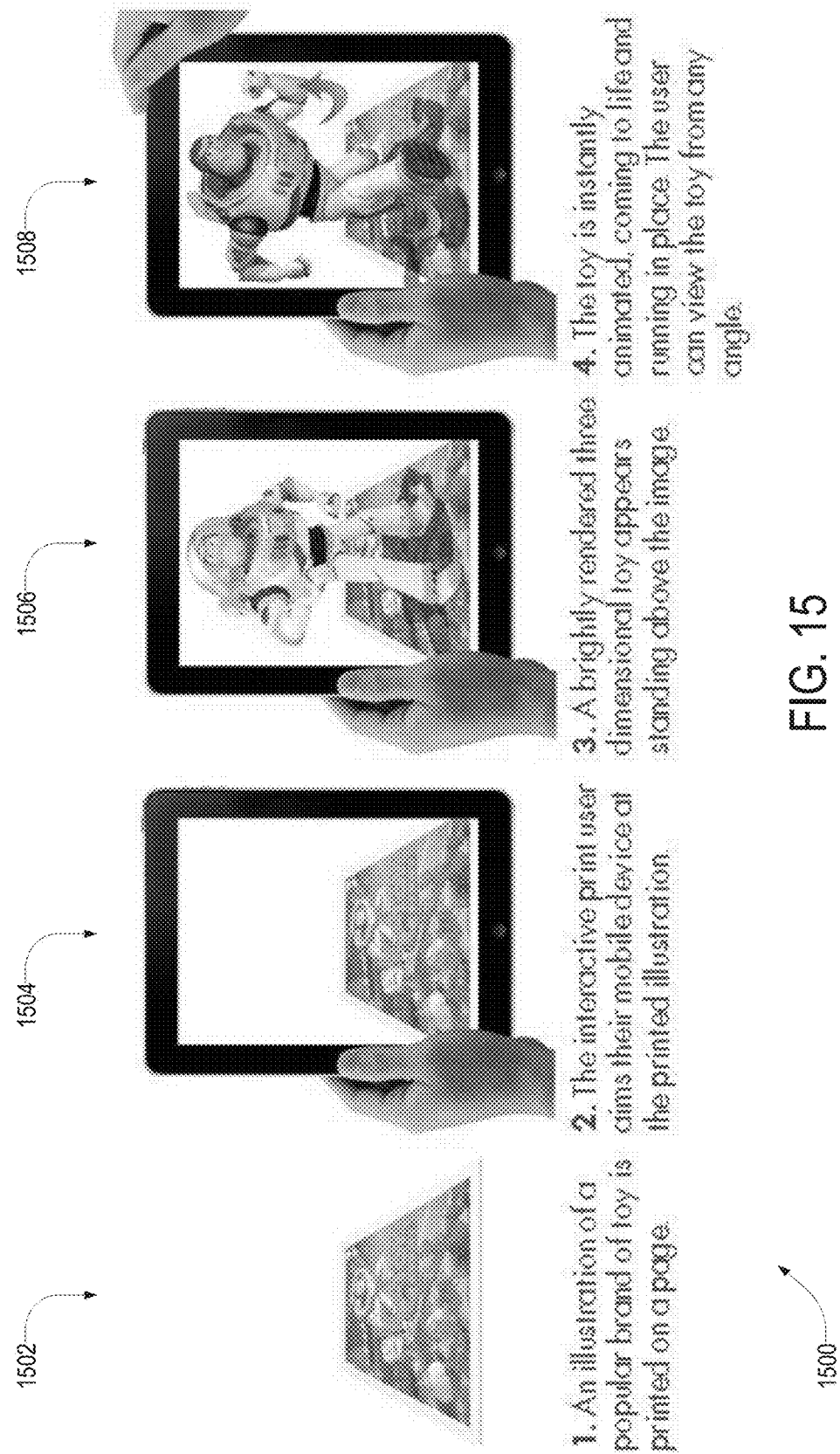
FIG. 15 is a diagram illustrating an example embodiment of a content generated using a "magic movie" template.

FIG. 15 illustrates an example of a content generated using "magic movie" template 1500. At 1502, an illustration of a popular brand of toy is printed on a page. At 1504, a user aims a device at the printed illustration. At 1506, a rendered three-dimensional virtual object (e.g., toy) appears standing about the image of the printed illustration. At 1508, the toy is animated and the user can view the toy from any angle.

Figure 16A:
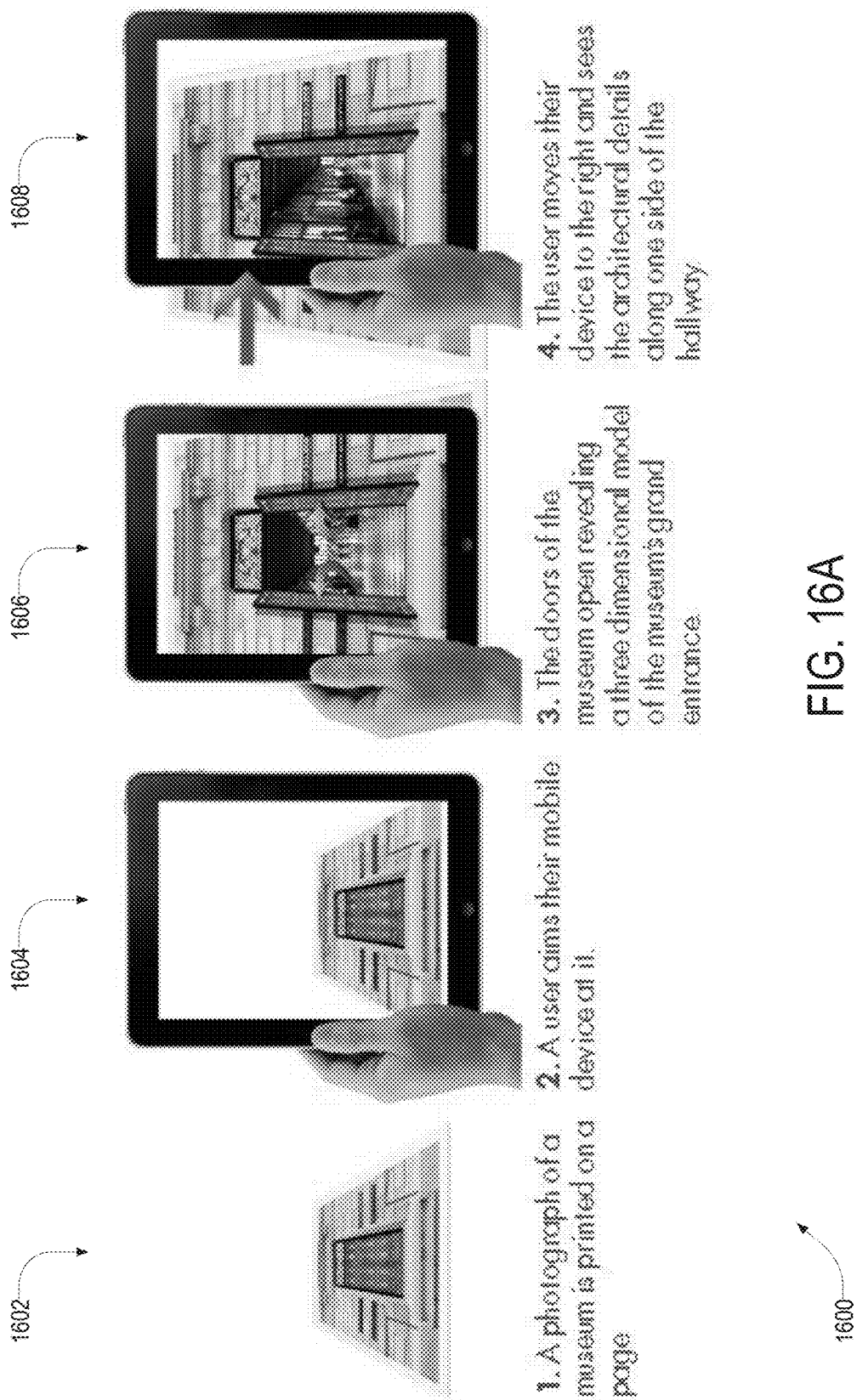
FIGS. 16A and 16B are diagrams illustrating example embodiments of a content generated using an "X Ray specs" template.
Figure 16B:
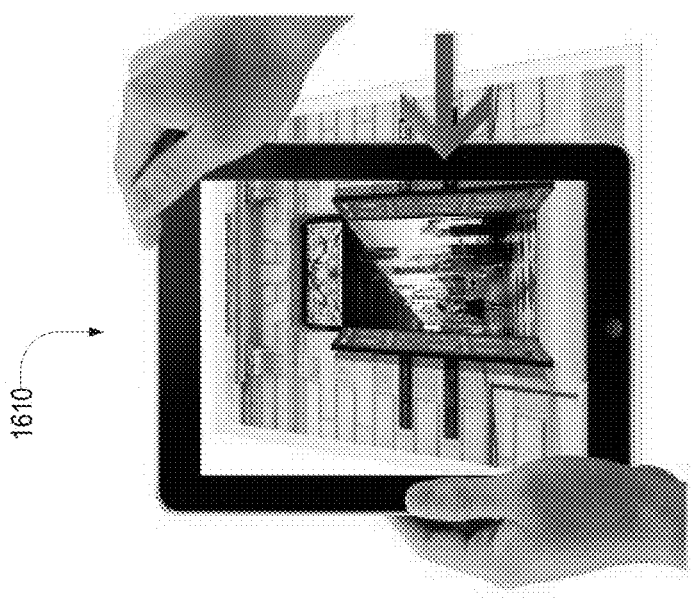

FIGS. 16A-16B illustrate an example of a content generated using an "X Ray specs" template 1600. At 1602, a photograph of an entrance of a museum is printed on a page. At 1604, the user aims a mobile device at the photograph of the entrance of the museum. At 1606, virtual doors of the museum open revealing a three dimensional model of the museum's grand entrance. At 1608, the user can move the device to the right and see the architectural details along one side of the hallway. At 1610, the user can move the device to the left and see the architectural details along one side of the hallway. The "X Ray specs" template 1600 may include an option for two-dimensional images and another option for three-dimensional images.

Figure 17A:
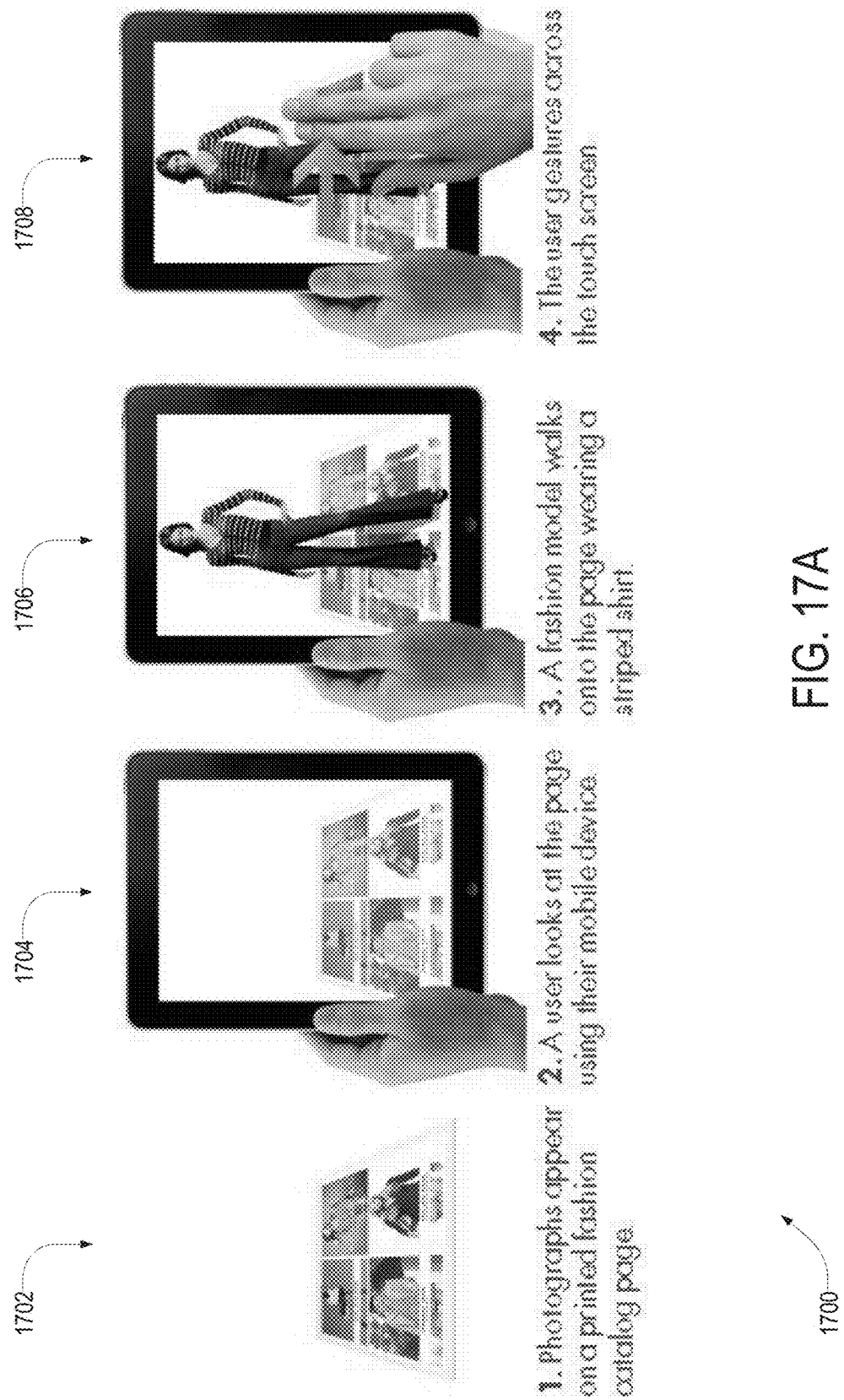
FIGS. 17A-17B are diagrams illustrating example embodiments of a content generated using a "paper doll" template.
Figure 17B:
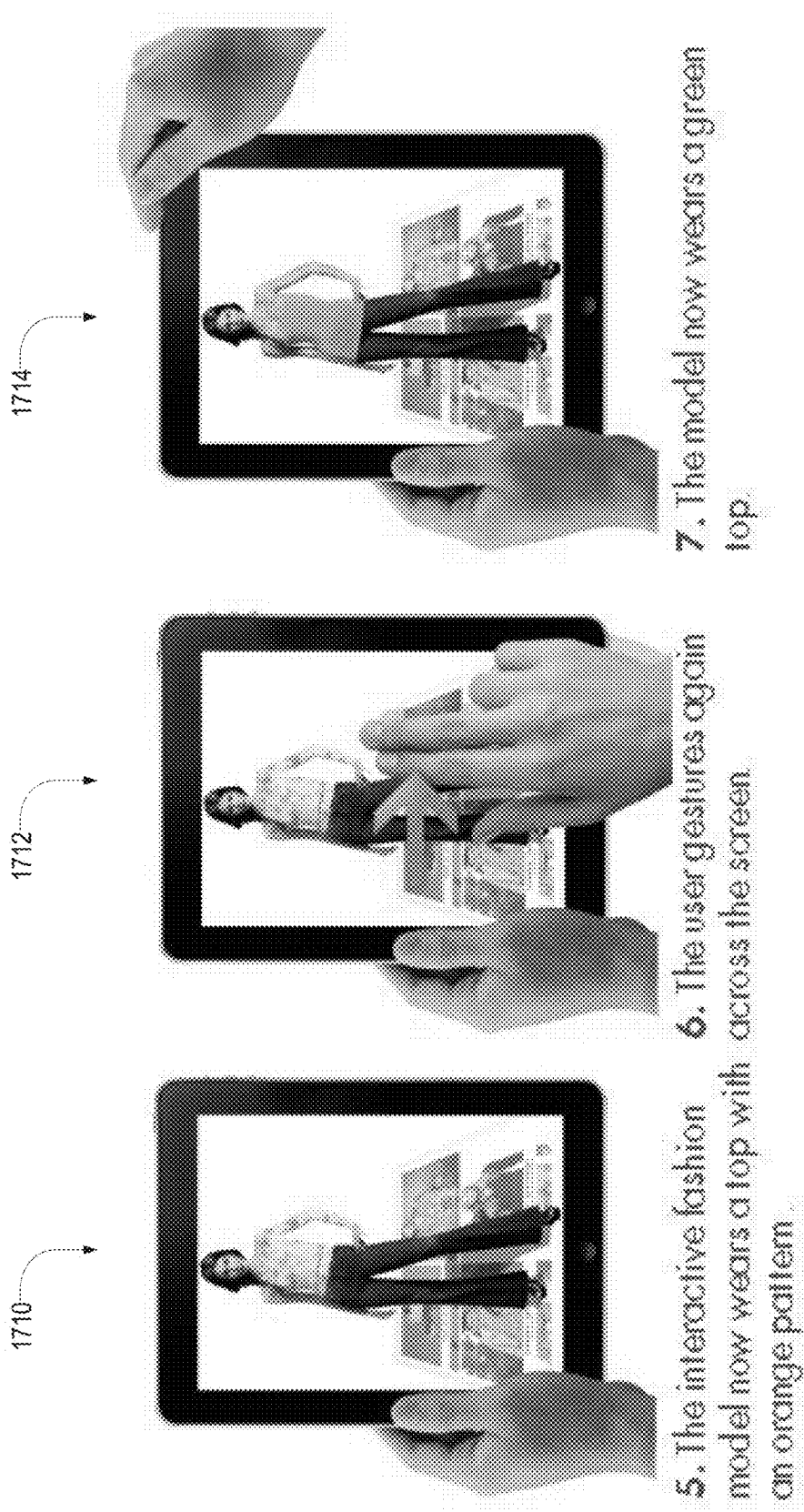

FIGS. 17A-17B illustrate an example of a content generated using a "paper doll" template 1700. At 1702, a photograph appears on a printed fashion catalog page. At 1704, a user uses a device to look at the page. At 1706, a fashion model walks on the page wearing an outfit from the same page. At 1708, the user may use gestures across the display of the device to select another outfit. At 1710, the fashion model now wears another outfit. At 1712, the user may again use gestures across the display of the device to select another outfit. At 1714, the fashion model now wears another outfit.

Figure 18A:
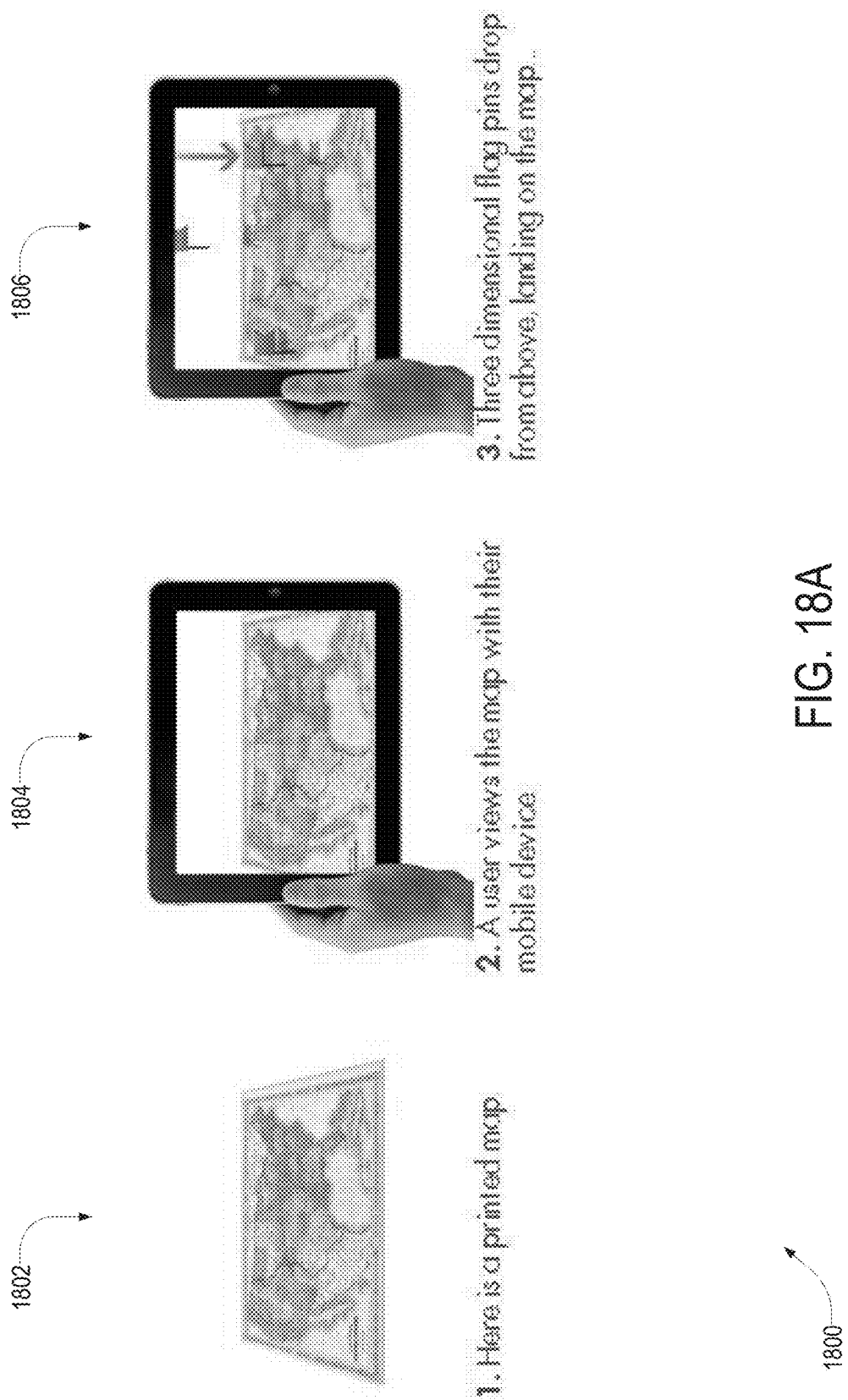
FIGS. 18A-18B are diagrams illustrating example embodiments of a content generated using an "info layer" template.
Figure 18B:
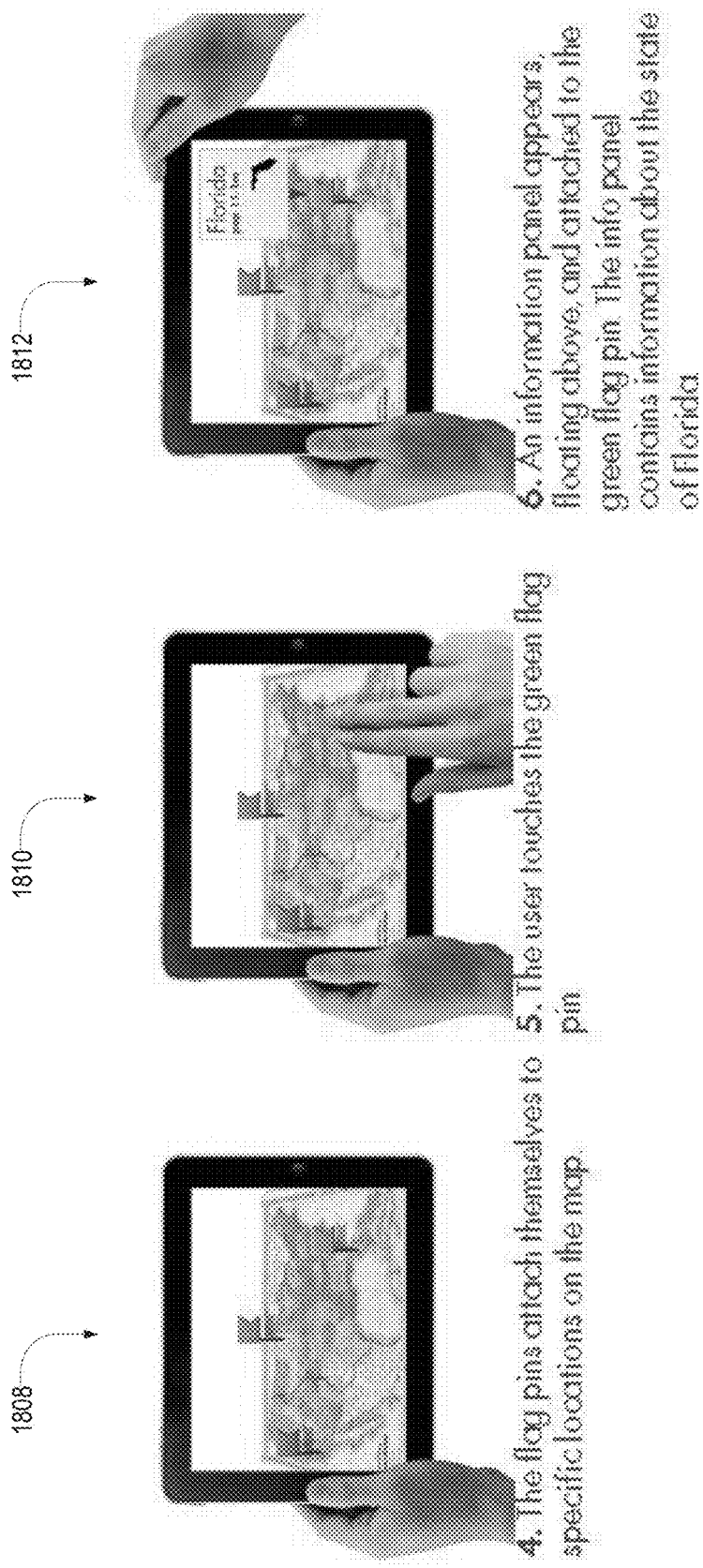

FIGS. 18A-18B illustrate an example of a content generated using an "info layer" template 1800. At 1802, a printed map is provided. At 1804, a user views the printed map with a device. At 1806, three-dimensional flag pins are drop from above landing on an image of the printed map. At 1808, the flag pins attach themselves to specific locations on an image of the printed map. At 1810, the user touches a flag pin. At 1812, an information panel may appear in the display, floating above the flag pin that was touched. The information panel may include information relevant to the location corresponding to the flag pin that was touched.

Figure 19A:
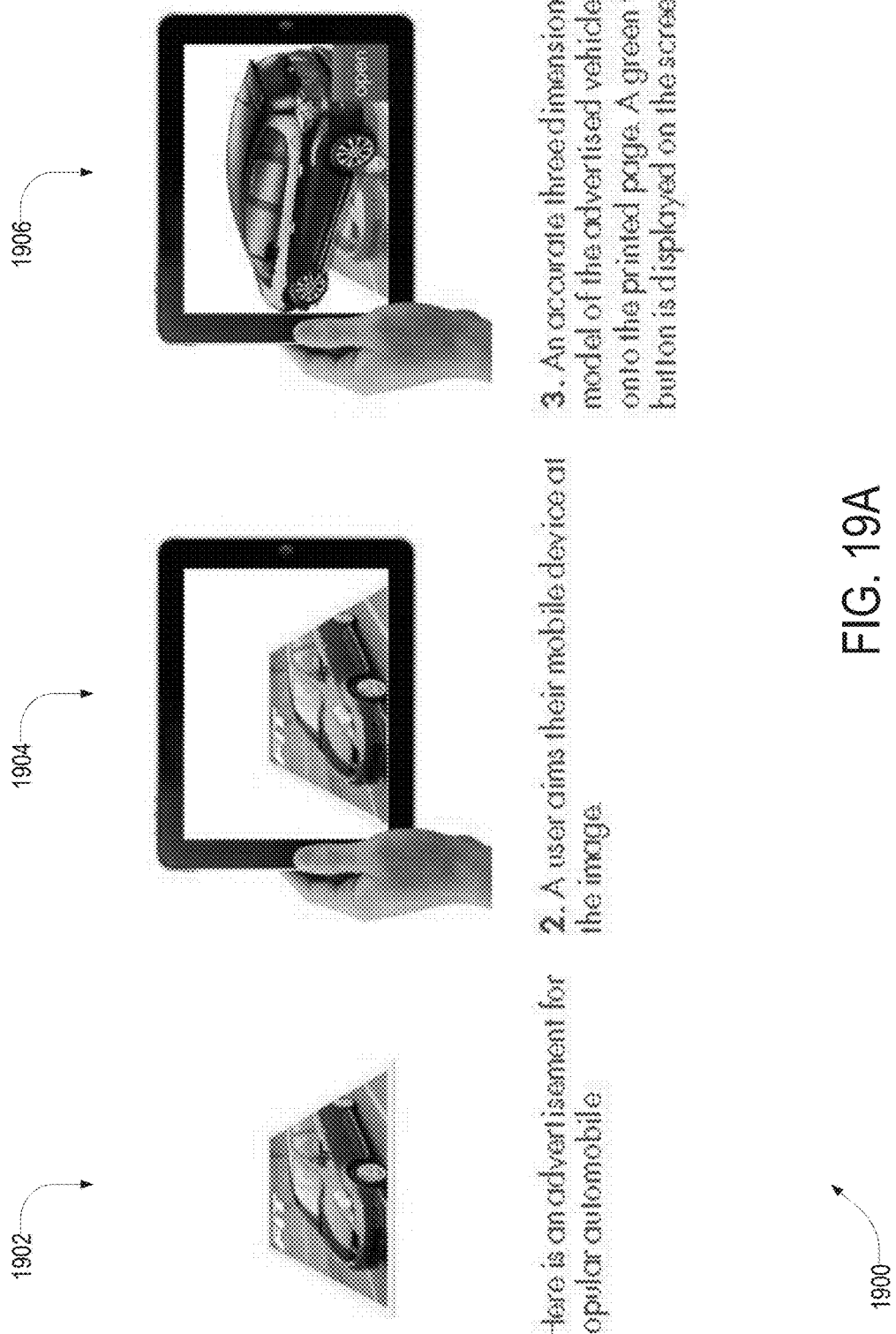
FIGS. 19A-19B are diagrams illustrating example embodiments of a content generated using an "interactive" template.
Figure 19B:
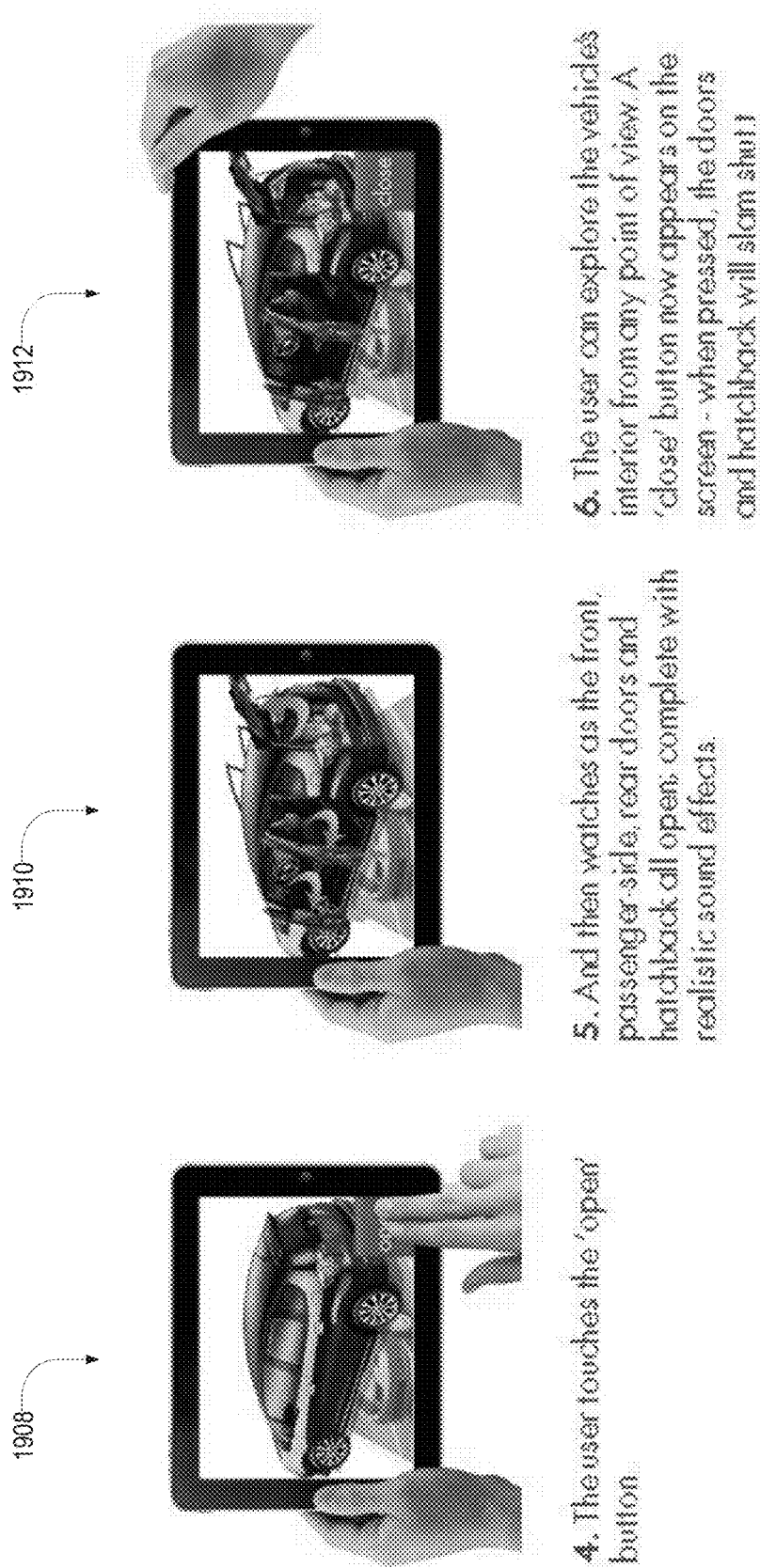

FIGS. 19A-19B illustrate an example of a content generated using an "interactive" template 1900. At 1902, a printed ad of a popular car is provided. At 1904, a user aims a device to capture a real time image of the printed ad. At 1906, a three-dimensional model of the advertised car drops onto the printed page. An "open" button may be displayed on the device. At 1908, the user touches the "open" button. At 1910, the doors and trunk of the three-dimensional model of the advertised car are open with sound effects. At 1912, the user can explore the vehicle interior from any point of view. A "close" button may appear on the screen to close the doors and trunk of the three-dimensional model of the advertised car.

In one embodiment, the user selects a template and provides content (physical object image and virtual content model) to the selected template. In another embodiment, the user selects a template, and may also select from choice of content (physical object image or virtual content model) preconfigured for the user.

The template 301 may include a physical content builder 302 and a virtual content builder 304. The physical content builder 302 may be used to receive a two-dimensional image or a three-dimensional object model for the content identifier. The virtual content builder 304 may be used to receive a two-dimensional or three-dimensional virtual object model for the virtual object content. In addition, the template 301 may collect metadata information about the content identifier and the virtual object content. The metadata information may include, for example, location, size, color, brand, and keywords. The content identifier may be optimized using the metadata information. For example, a picture is submitted as a content identifier. Metadata corresponding to the picture may include a brand product name associated with the picture.

The experience content dataset builder 306 may associate the content identifier from the physical content builder with the virtual object content from the virtual content builder to generate the experience content dataset based on the features of a selected template. In one embodiment, the experience content dataset builder 306 may include a format converter 308 and a content characteristics analysis module 310.

The format converter 308 may be used to convert a format the content identifier for other required components. For example, the format converter 308 may convert a picture into a thumbnail for menu design, large format for layout design. The format converter 308 may also be used to generate a mathematical hash of the content identifier for tracking a recognized content identifier with the device.

The content characteristics analysis module 310 may determine a characteristic of the virtual object content, and generate a presentation of an interactive feature related to the characteristic of the virtual object at the device. For example, a button associated with an animation of the virtual object may be automatically generated in the presented of the virtual object at the device.

Figure 4:
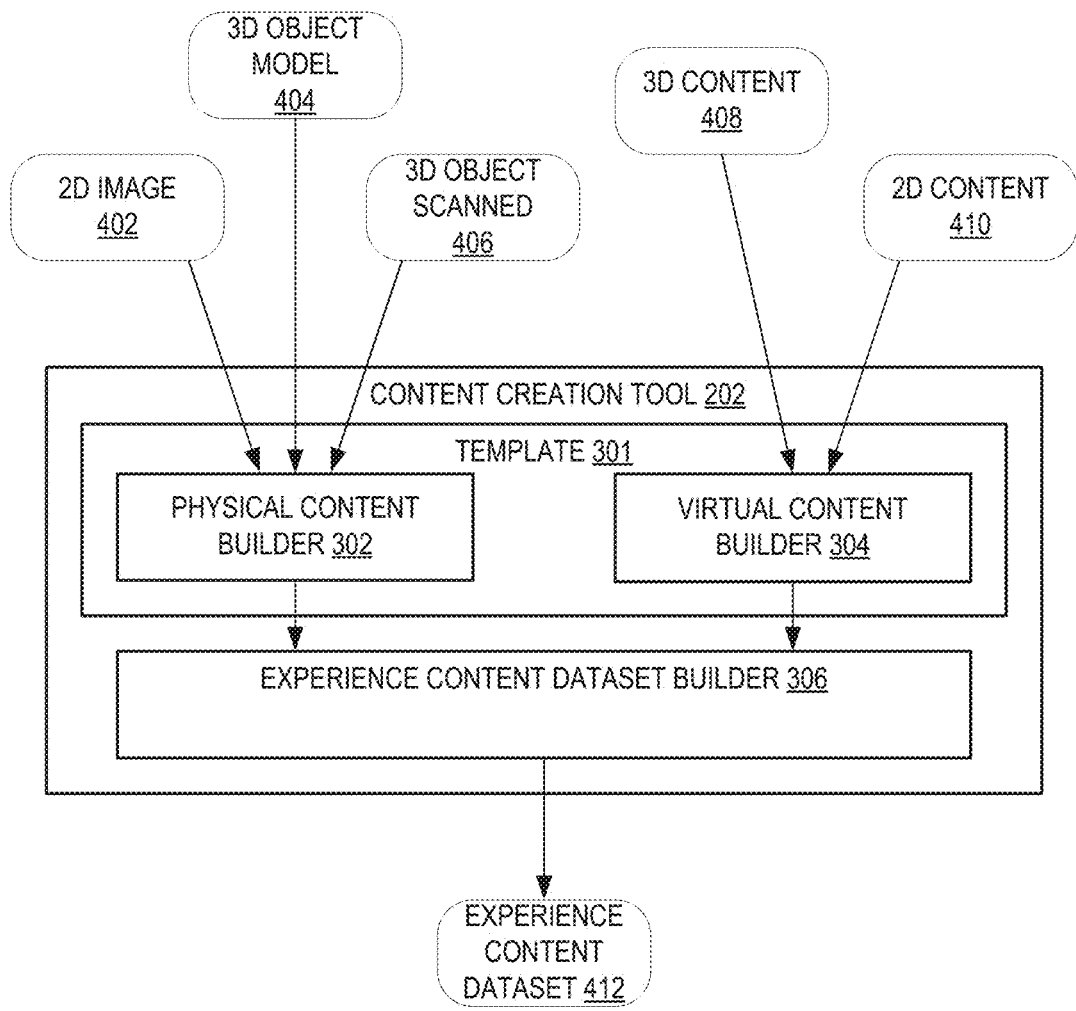
FIG. 4 is a block diagram illustrating an example of an operation of the content creation tool, according to some example embodiments.

FIG. 4 is a block diagram illustrating an example of an operation of the content creation tool 202, according to some example embodiments. The physical content builder 302 receives via the template, a two-dimensional image 402 (e.g., a picture), a three-dimensional object model 404, and a three-dimensional object scanned model 406. The virtual content builder 304 receives via the template, a three-dimensional virtual content 408 (e.g., a three-dimensional virtual car with animated features), a two-dimensional virtual content 410 (e.g., a picture). The experience content dataset builder 306 associates (e.g., maps) the physical content model received at physical content builder 302 with a corresponding virtual content module received at the virtual content builder 304 to generate an experience content dataset 412. The experience content dataset 412 can be communicated to the device 101, so that when the device 101 recognizes a scanned picture from the experience content dataset 412, an experience corresponding to the recognized scanned picture is generated at the device 101. The experience may include enabling the user 102 to interact with interactive features of the virtual object presented at the device 101 in combination with a real-time representation of the scanned picture in the display of the device 101.

Figure 5:
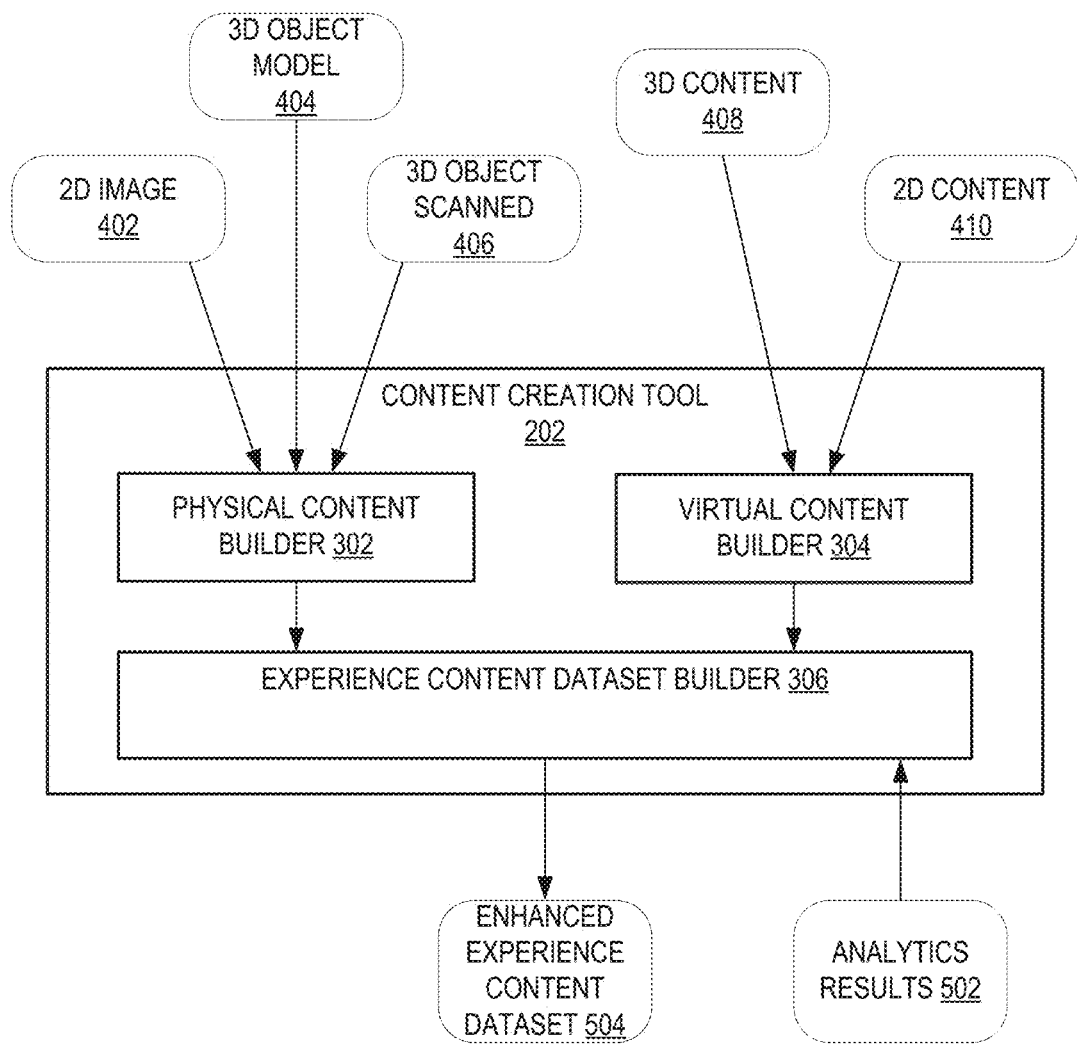
FIG. 5 is a block diagram illustrating another example of an operation of the content creation tool, according to some example embodiments.

FIG. 5 is a block diagram illustrating another example of an operation of the content creation tool, according to some example embodiments. The experience content dataset builder 306 may access analytics results 502 to generate an enhanced version of the experience content dataset 412 (e.g., an enhanced experience content dataset 504). The enhanced experience content dataset 504 may be customized to the user, or may be modified based on real-time analytics results of other devices. For example, the enhanced experience content dataset 504 may generate a representation of a virtual object voted most popular using the augmented reality application in devices.

Figure 6:
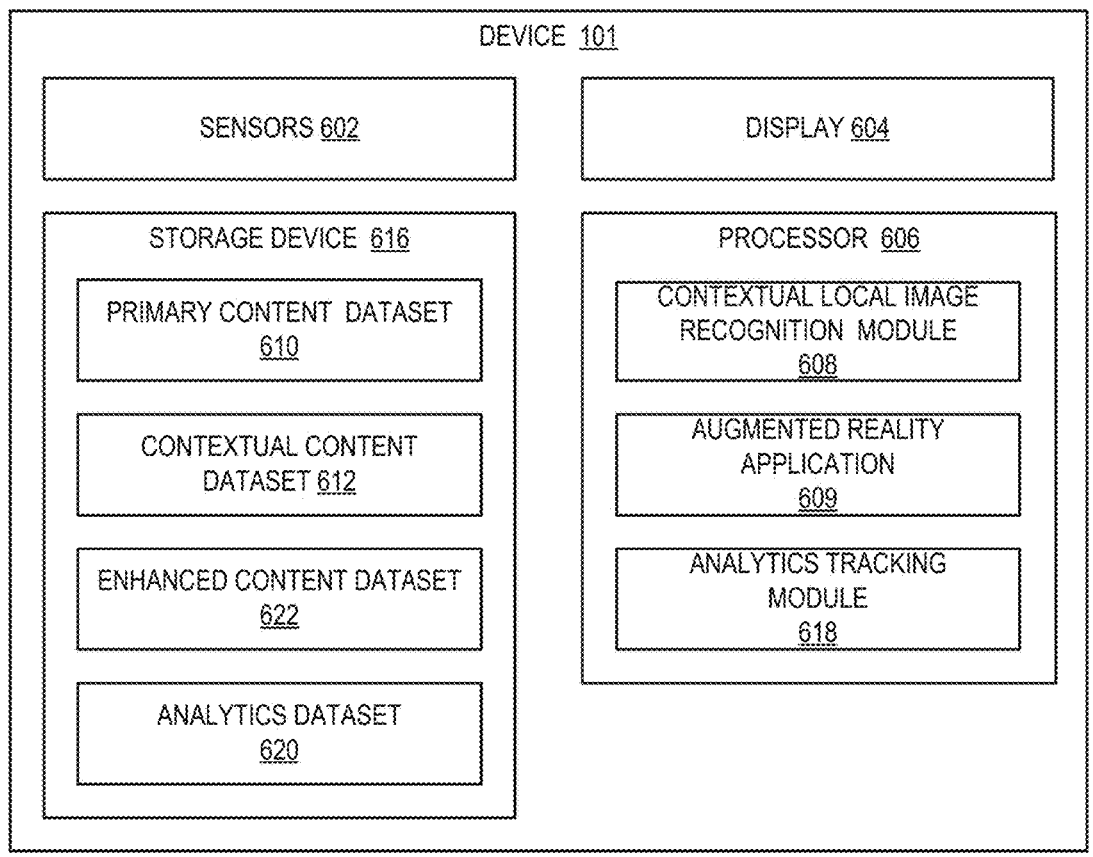
FIG. 6 is a block diagram illustrating modules (e.g., components) of a device, according to some example embodiments.

FIG. 6 is a block diagram illustrating modules (e.g., components) of the device 101, according to some example embodiments. The device 101 may include sensors 602, a display 604, a processor 606, and a storage device 616. For example, the device 101 may be a desktop computer, a vehicle computer, a tablet computer, a navigational device, a portable media device, or a smart phone of a user. The user may be a human user (e.g., a human being), a machine user (e.g., a computer configured by a software program to interact with the device 101), or any suitable combination thereof (e.g., a human assisted by a machine or a machine supervised by a human).

The sensors 602 may include, for example, a proximity sensor, an optical sensor (e.g., charged-coupled device (CCD)), an orientation sensor (e.g., gyroscope), an audio sensor (e.g., a microphone). For example, the sensors 602 may include a rear facing camera and a front facing camera in the device 101. It is noted that the sensors described herein are for illustration purposes and the sensors 602 are thus not limited to the ones described.

The display 604 may include, for example, a touchscreen display configured to receive a user input via a contact on the touchscreen display. In another example, the display 604 may include a screen or monitor configured to display images generated by the processor 606.

The processor 606 may include a contextual local image recognition module 608, a consuming application such as an augmented reality application 609, and an analytics tracking module 618.

The augmented reality application 609 may generate a visualization of a three-dimensional virtual object overlaid on an image of a physical object captured by a camera of the device 101 in the display 604 of the device 101. A visualization of the three-dimensional virtual object may be manipulated by adjusting a position of the physical object relative to the camera of the device 101. Similarly, the visualization of the three-dimensional virtual object may be manipulated by adjusting a position of the device 100 relative to the physical object.

In one embodiment, the augmented reality application 609 communicates with the contextual local image recognition dataset module 608 in the device 101 to retrieve three-dimensional models of virtual objects associated with a captured image. For example, the captured image may include a visual reference (also referred to as a marker) that consists of an identifiable image, symbol, letter, number, machine-readable code. For example, the visual reference may include a bar code, a QR code, or an image that has been previously associated with a three-dimensional virtual object.

The contextual local image recognition dataset module 608 may be configured to determine whether the captured image matches an image locally stored in a local database of images and corresponding additional information (e.g., three-dimensional model and interactive features) on the device 101. In one embodiment, the contextual local image recognition module 608 retrieves a primary content dataset from the server 110, generates and updates a contextual content dataset based an image captured with the device 101.

The analytics tracking module 618 may track analytics data related to how the user 102 is engaged with the physical object. For example, the analytics tracking module 618 may track where on the physical or virtual object the user 102 has looked at, how long the user 102 has looked at each location on the physical or virtual object, how the user 102 held the device 101 when looking at the physical or virtual object, which features of the virtual object the user 102 interacted with (e.g., such as whether a user tapped on a link in the virtual object).

The storage device 616 may be configured to store a database of visual references (e.g., images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the device 101 relative to the picture of the shoe. Features of the three-dimensional virtual shoe may include selectable icons on the three-dimensional virtual model of the shoe. An icon may be selected or activated by tapping or moving on the device 101.

In one embodiment, the storage device 604 includes a primary content dataset 610, a contextual content dataset 612, an enhanced content dataset 622, and analytics data 620.

The primary content dataset 610 includes, for example, a first set of images and corresponding experiences (e.g., interactive three-dimensional virtual object models). The primary content dataset 610 may include a core set of images or the most popular images determined by the server 110. The core set of images may include a limited number of images identified by the server 110. For example, the core set of images may include the cover image of the ten most popular magazines and the corresponding experiences (e.g., virtual objects). In another example, the server 110 may generate the first set of images based on the most popular or often scanned images received at the server 110.

The contextual content dataset 612 includes, for example, a second set of images and corresponding experiences (e.g., three-dimensional virtual object models) retrieved from the server 110. For example, images captured with the device 101 that are not recognized in the primary content dataset 610 are submitted to the server 110 for recognition. If the captured image is recognized by the server, a corresponding experience may be downloaded at the device 101 and stored in the contextual content dataset 612.

The analytics data 620 corresponds to analytics data collected by the analytics tracking module 618.

The enhanced content dataset 622 includes, for example, an enhanced set of images and corresponding experiences downloaded from the server 110 based on the analytics data collected by the analytics tracking module 618.

In one embodiment, the device 101 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the device 101). Accordingly, the network 108 may be a wired network, a wireless network (e.g., a mobile or cellular network), or any suitable combination thereof. The network may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
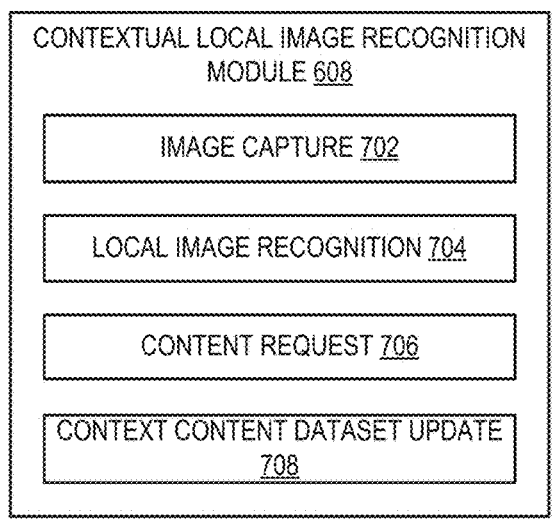
FIG. 7 is a block diagram illustrating modules (e.g., components) of a contextual local image recognition module, according to some example embodiments.

FIG. 7 is a block diagram illustrating modules (e.g., components) of a contextual local image recognition dataset module, according to some example embodiments. The contextual local image recognition dataset module 608 may include an image capture module 702, a local image recognition module 704, a content request module 706, and a context content dataset update module 708.

The image capture module 702 may capture an image with a lens of the device 101. For example, the image capture module 702 may capture the image of a physical object pointed at by the device 101. In one embodiment, the image capture module 702 may capture one image or a series of snapshots. In another embodiment, the image capture module 702 may capture an image when sensors 602 (e.g., vibration, gyroscope, compass, etc.) detect that the device 101 is no longer moving.

The local image recognition module 704 determines that the captured image correspond to an image stored in the primary content dataset 610 and locally renders the three-dimensional virtual object model corresponding to the image captured with the device 101 when the image captured with the device 101 corresponds to one of the set of images of the primary content dataset 610 stored in the device 101.

In another embodiment, the local image recognition module 704 determines that the captured image correspond to an image stored in the context content dataset 612 and locally renders the three-dimensional virtual object model corresponding to the image captured with the device 101 when the image captured with the device 101 corresponds to one of the set of images of the context content dataset 612 stored in the device 101.

The content request module 706 may request the server 110 for the three-dimensional virtual object model corresponding to the image captured with the device 101 when the image captured with the device 101 does not correspond to one of the set of images in the primary content dataset 612 and the context content dataset 612 in the storage device 604.

The context content dataset update module 708 may receive the three-dimensional virtual object model corresponding to the image captured with the device 101 from the server 110 in response to the request generated by the content request module 706. In one embodiment, the context content dataset update module 708 may update the contextual content dataset 612 with the three-dimensional virtual object model corresponding to the image captured with the device 101 from the server 110 when the image captured with the device 101 does not correspond to any images stored locally in the storage device 604 of the device 101.

In another embodiment, the content request module 706 may determine usage conditions of the device 101 and generate a request to the server 110 for a third set of images and corresponding three-dimensional virtual object models based on the usage conditions. The usage conditions may be related to when, how often, where, and how the user is using the device 101. The context content dataset update module 708 may update the contextual content dataset with the third set of images and corresponding three-dimensional virtual object models.

For example, the content request module 706 determines that the user 102 scans pages of a newspaper in the morning time. The content request module 706 then generates a request to the server 110 for a set of images and corresponding experiences that are relevant to usage of the user 102 in the morning. For example, the content request module 706 may retrieve images of sports articles that the user 102 is most likely to scan in the morning and a corresponding updated virtual score board of the team mentioned in the article. The experience may include, for example, a fantasy league score board update personalized to the user 102.

In another example, the content request module 706 determines that the user 102 often scans the business section of a newspaper. The content request module 706 then generates a request to the server 110 for a set of images and corresponding experiences that are relevant to the user 102. For example, the content request module 706 may retrieve images of business articles of the next issue of the newspaper as soon as the next issue business articles are available. The experience may include, for example, a video report corresponding to an image of the next issue business article.

In yet another embodiment, the content request module 706 may determine social information of the user 102 of the device 101 and generate a request to the server 110 for another set of images and corresponding three-dimensional virtual object models based on the social information. The social information may be obtained from a social network application in the device 101. The social information may relate to who the user 102 has interacted with, who the user 102 has shared experiences using the augmented reality application 609 of the device 101. The context content dataset update module 708 may update the contextual content dataset with the other set of images and corresponding three-dimensional virtual object models.

For example, the user 102 may have scanned several pages of a magazine. The content request module 706 determines from a social network application that the user 102 is friend with another user who share similar interests and read another magazine. As such, the content request module 706 may generate a request to the server 110 for a set of images and corresponding experiences related to the other magazine.

In another example, if the content request module 706 determines that the user 102 has scanned one or two images from the same magazine, the content request module 706 may generate a request for additional content from other images in the same magazine.

Figure 8:
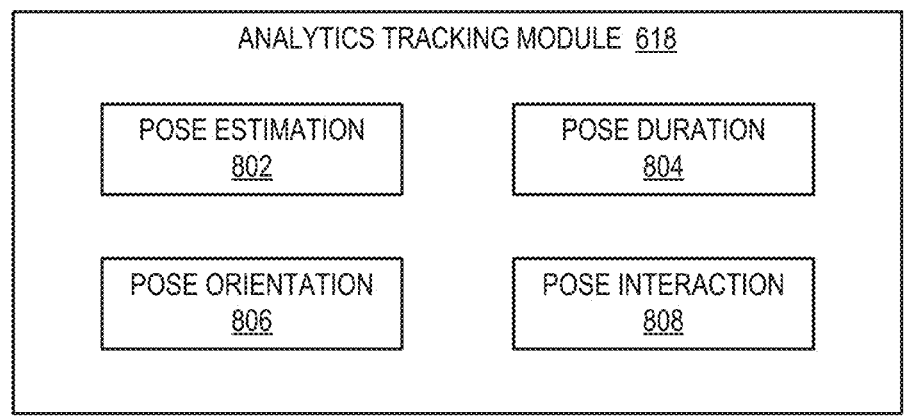
FIG. 8 is a block diagram illustrating modules (e.g., components) of the analytics tracking module, according to some example embodiments

FIG. 8 is a block diagram illustrating modules (e.g., components) of the analytics tracking module 618, according to some example embodiments. The analytics tracking module 618 includes a pose estimation module 802, a pose duration module 804, a pose orientation module 806, and a pose interaction module 808.

The pose estimation module 802 may be configured to detect the location on a virtual object or physical object the device 101 is aiming at. For example, the device 101 may aim at the top of a virtual statue generated by aiming the device 101 at the physical object 104. In another example, the device 101 may aim at the shoes of a person in a picture of a magazine.

The pose duration module 804 may be configured to determine a time duration within which the device 101 is aimed at a same location on the physical or virtual object. For example, the pose duration module 804 may measure the length of the time the user 102 has aimed and maintained the device at the shoes of a person in the magazine. Sentiment and interest of the shoes may be inferred based on the length of the time the user 102 has held the device 101 aimed at the shoes.

The pose orientation module 806 may be configured to determine an orientation of the device aimed at the physical or virtual object. For example, the pose orientation module 806 may determine that the user 102 is holding the device 101 in a landscape mode and thus may infer a sentiment or interest based on the orientation of the device 101.

The pose interaction module 808 may be configured to determine interactions of the user 102 on the device 101 with respect the virtual object corresponding to the physical object. For example, the virtual object may include features such as virtual menus or button. When the user 102 taps on the virtual button, a browser application in the device 101 is launched to a preselected website associated with the tapped virtual dialog box. The pose interaction module 408 may measure and determine which buttons the user 102 has tapped on, the click through rate for each virtual buttons, websites visited by the user 102 from the augmented reality application 609, and so forth.

Figure 9:
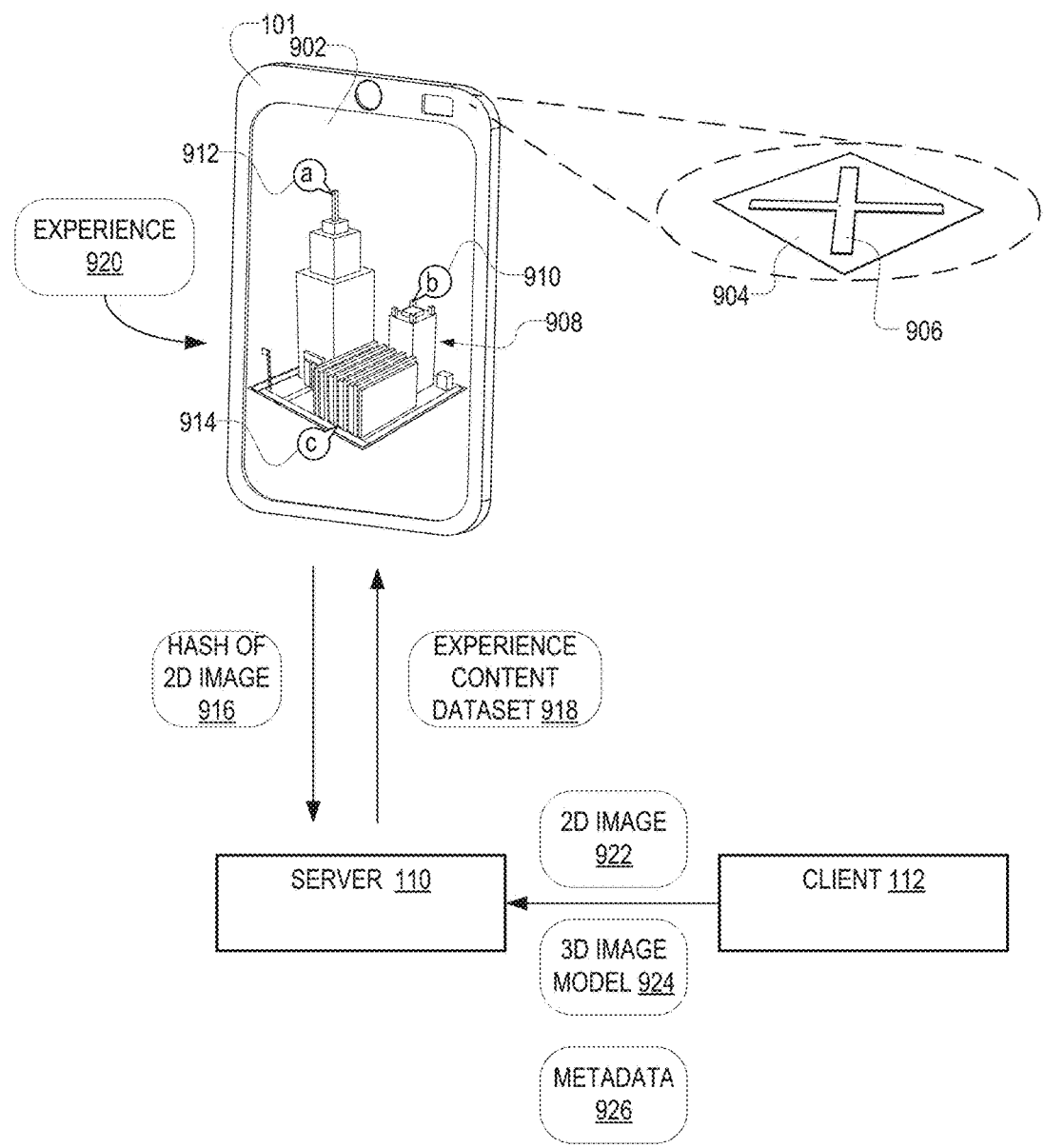
FIG. 9 is a schematic diagram illustrating an example of consuming an experience, according to some example embodiments.

FIG. 9 is a schematic diagram illustrating an example of consuming an experience, according to some example embodiments. The device 101 may be pointed at a physical object 904 having an image 906 that is recognized by the device 101. The device 101 submits a hash of the image 916 to the server 110 at operation 916. The server 110 includes a content creation tool that the client 112 used to submit a two-dimensional picture 922 corresponding to the image 906, a three-dimensional image model 924 associated with the two-dimensional picture 922, and metadata 926 associated with the two-dimensional picture 922.

The content creation tool at the server 110 generates an experience content dataset 918 corresponding to the hash two-dimensional image 916 for the device 101 to generate an experience 920 in the display 902 of the device 101. The experience may include interactive features with points of interests 912, 910, 914 of the three-dimensional virtual object 908, which may be formed from the three-dimensional image model 924. In one embodiment, a rendering engine at the device 101 renders the three-dimensional virtual object 908.

Figure 10:
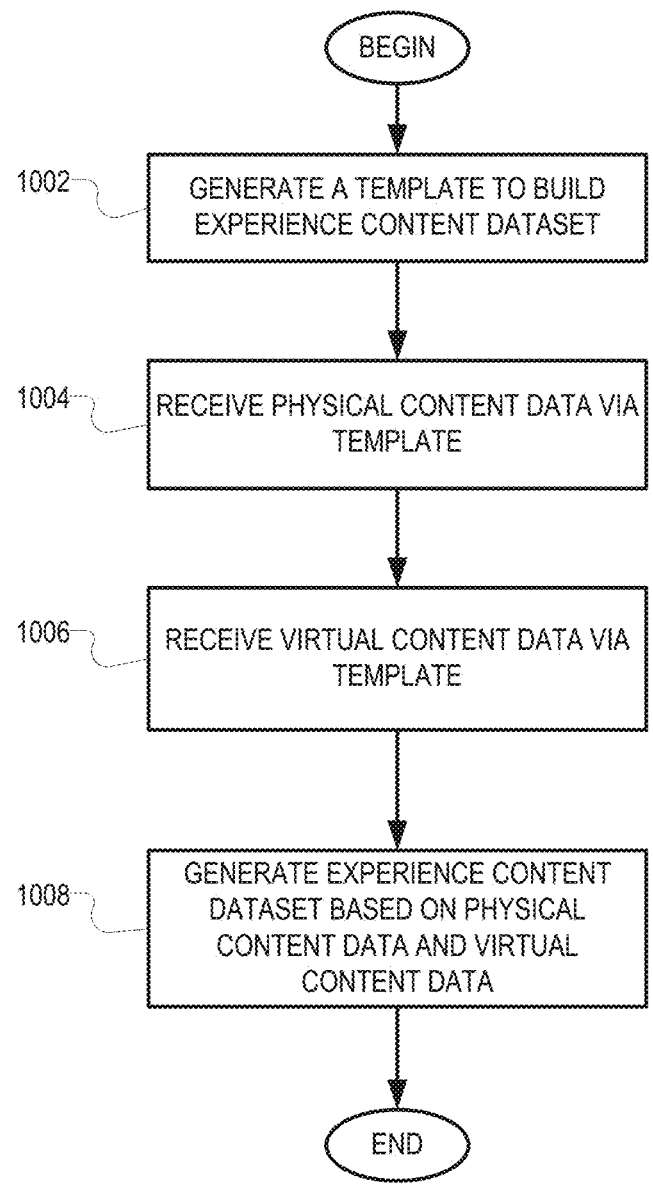
FIG. 10 is a flowchart illustrating an example method for creating an experience content dataset using a template, according to some example embodiments.

FIG. 10 is a flowchart illustrating an example method for creating an experience content dataset, using a template, according to some example embodiments. At operation 1002, a template of the content creation tool of the server 110 is generated to build an experience content dataset.

At operation 1004, the template is used to receive physical content data. The physical content data may include data for a two-dimensional image or a three-dimensional object model.

At operation 1006, the template is used to receive virtual content data. The virtual content data may include data for a two-dimensional or three-dimensional virtual object model.

At operation 1008, the content creation tool generates an experience content dataset based on the physical content data and based on virtual content data.

Figure 11:
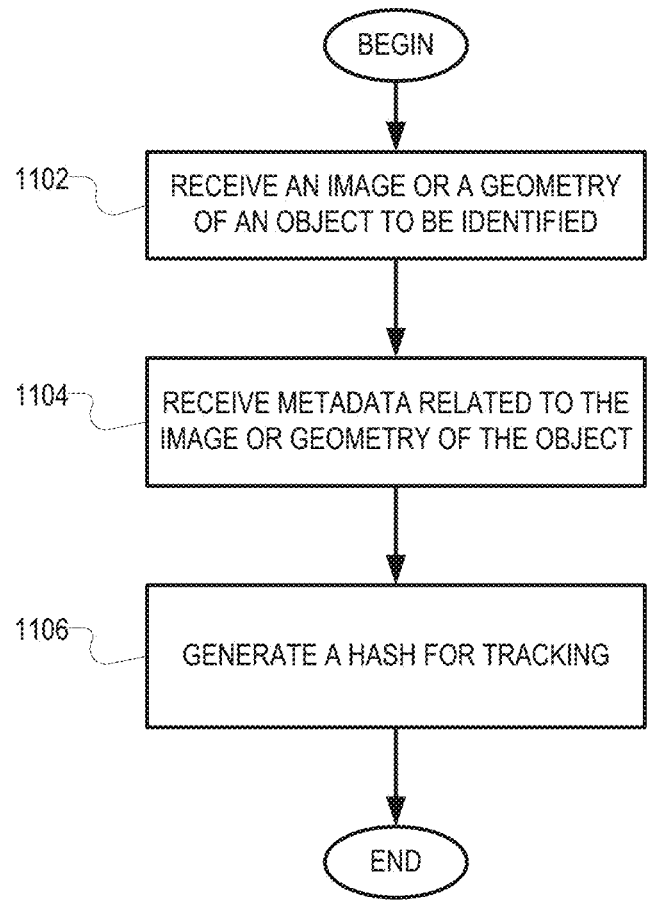
FIG. 11 is a flowchart illustrating an example method for using a template for content creation, according to some example embodiments.

FIG. 11 is a flowchart illustrating an example method for using a template for content creation, according to some example embodiments. At operation 1102, the content creation tool receives an image or geometry of an object to be identified. At operation 1104, the content creation tool receives metadata related to the image or geometry of the object. At operation 1106, the content creation tool generates a hash for tracking the image or geometry of the object.

Figure 12:
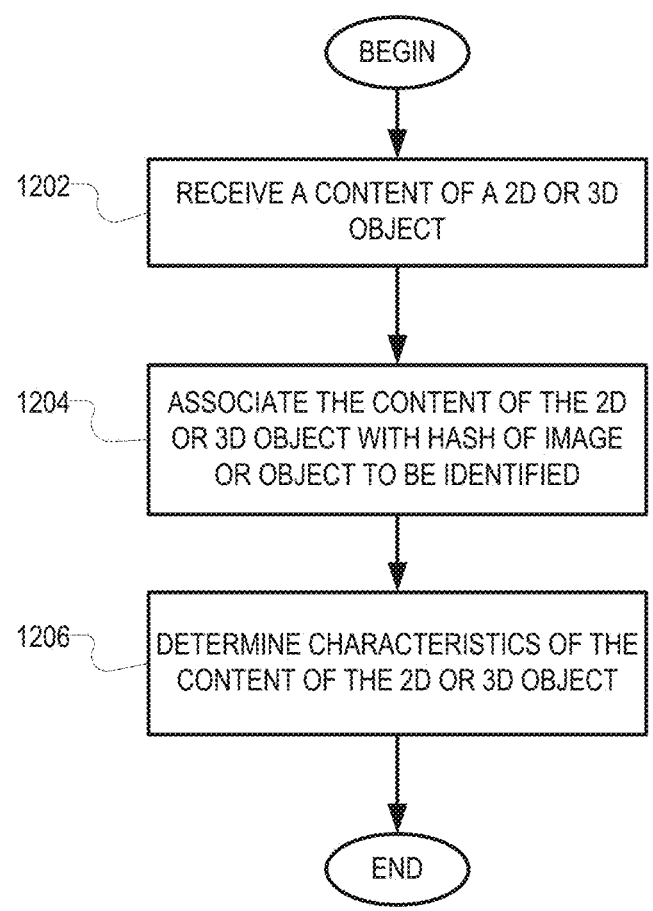
FIG. 12 is a flowchart illustrating another example method for using a template for content creation, according to some example embodiments.

FIG. 12 is a flowchart illustrating another example method for using a template for content creation, according to some example embodiments. At operation 1202, the content creation tool receives a content of a two-dimensional or three-dimensional object. At operation 1204, the content creation tool associates the content of the two-dimensional or three-dimensional object with the hash of the image or object to be identified. At operation 1206, the content creation tool determines characteristics of the content of the two-dimension or three-dimensional object.

Figure 13:
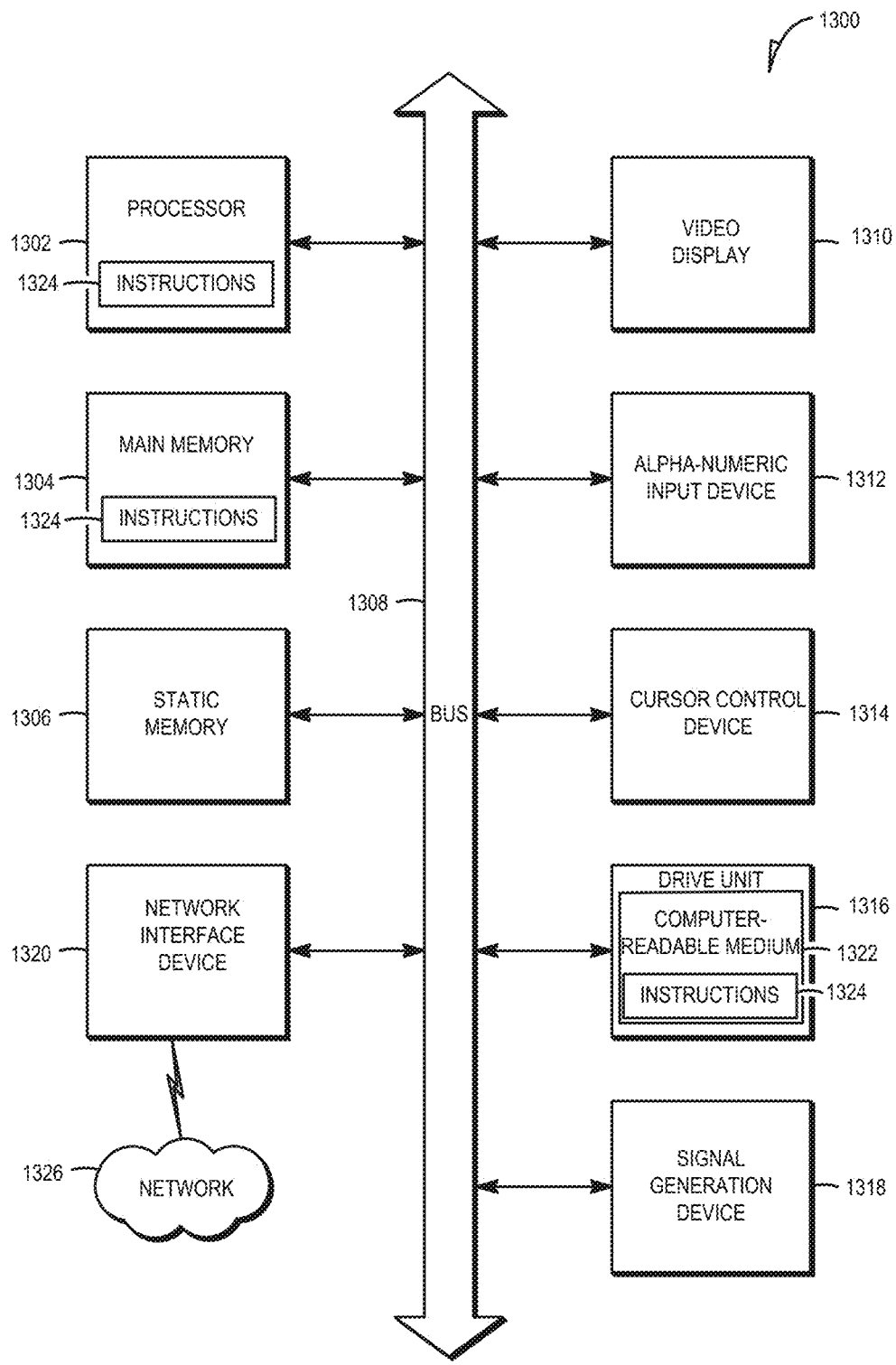
FIG. 13 is a block diagram illustrating components of a machine, according to some example embodiments, able to read instructions from a machine-readable medium and perform any one or more of the methodologies discussed herein.

FIG. 13 is a block diagram illustrating components of a machine 1300, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 13 shows a diagrammatic representation of the machine 1300 in the example form of a computer system and within which instructions 1324 (e.g., software, a program, an application, an applet, an app, or other executable code) for causing the machine 1300 to perform any one or more of the methodologies discussed herein may be executed, in whole or in part. In alternative embodiments, the machine 1300 operates as a standalone device or may be connected (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include a collection of machines that individually or jointly execute the instructions 1324 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The machine 1300 may further include a graphics display 1310 (e.g., a plasma display panel (PDP), a light emitting diode (LED) display, a liquid crystal display (LCD), a projector, or a cathode ray tube (CRT)). The machine 1300 may also include an alphanumeric input device 1312 (e.g., a keyboard), a cursor control device 1314 (e.g., a mouse, a touchpad, a trackball, a joystick, a motion sensor, or other pointing instrument), a storage unit 1316, a signal generation device 1318 (e.g., a speaker), and a network interface device 1320.

The storage unit 1316 includes a machine-readable medium 1322 on which is stored the instructions 1324 embodying any one or more of the methodologies or functions described herein. The instructions 1324 may also reside, completely or at least partially, within the main memory 1304, within the processor 1302 (e.g., within the processor's cache memory), or both, during execution thereof by the machine 1300. Accordingly, the main memory 1304 and the processor 1302 may be considered as machine-readable media. The instructions 1324 may be transmitted or received over a network 1326 (e.g., network 108) via the network interface device 1320.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1300), such that the instructions, when executed by one or more processors of the machine (e.g., processor 1302), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
one or more computer processors; and
one or more computer-readable mediums storing instructions that, when executed by the one or more computer processors, cause the system to perform operations comprising:
receiving, from a client device, a content identifier captured by an optical sensor of the client device, and a template selected by a user of the client device, the template corresponding to an interactive feature;
generating, based on the template and the content identifier, a content dataset;
providing the content data set to the client device, wherein the client device uses the content dataset to display a three-dimensional virtual object that provides the interactive feature on a display of the client device over a real-time image of the content identifier captured by the optical sensor of the client device.

2. The system of claim 1, wherein the content identifier is a two-dimensional image of a physical object and the three-dimensional virtual object is of the physical object.

3. The system of claim 2, wherein, while the three-dimensional virtual object is in a first state, the interactive feature causes the client device to change the three-dimensional virtual object from the first state to a second state in response to receiving a predetermined interaction from a user of the client device.

4. The system of claim 3, wherein, while the three-dimensional virtual object is in the second state, the interactive feature causes the client device to change the three-dimensional virtual object from the second state to the first state in response to receiving a second predetermined interaction from the user of the client device.

5. The system of claim 3, wherein changing the three-dimensional virtual object from the first state to the second state comprises causing the three-dimensional virtual object to change from a static state to performing an animation.

6. The system of claim 1, wherein the content dataset comprises additional information that the client device presents on the display in conjunction with the real-time image of the content identifier and the three-dimensional virtual object.

7. The system of claim 1, the operations further comprising:
generating analytics results based on analytics data received from the client device; and
generating a second content dataset based on the analytics results.

8. A method comprising:
receiving, from a client device, a content identifier captured by an optical sensor of the client device, and a template selected by a user of the client device, the template corresponding to an interactive feature;
generating, based on the template and the content identifier, a content dataset;
providing the content data set to the client device, wherein the client device uses the content dataset to display a three-dimensional virtual object that provides the interactive feature on a display of the client device over a real-time image of the content identifier captured by the optical sensor of the client device.

9. The method of claim 8, wherein the content identifier is a two-dimensional image of a physical object and the three-dimensional virtual object is of the physical object.

10. The method of claim 9, wherein, while the three-dimensional virtual object is in a first state, the interactive feature causes the client device to change the three-dimensional virtual object from the first state to a second state in response to receiving a predetermined interaction from a user of the client device.

11. The method of claim 10, wherein, while the three-dimensional virtual object is in the second state, the interactive feature causes the client device to change the three-dimensional virtual object from the second state to the first state in response to receiving a second predetermined interaction from the user of the client device.

12. The method of claim 10, wherein changing the three-dimensional virtual object from the first state to the second state comprises causing the three-dimensional virtual object to change from a static state to performing an animation.

13. The method of claim 8, wherein the content dataset comprises additional information that the client device presents on the display in conjunction with the real-time image of the content identifier and the three-dimensional virtual object.

14. The method of claim 8, further comprising:
generating analytics results based on analytics data received from the client device; and
generating a second content dataset based on the analytics results.

15. A non-transitory computer-readable medium storing instructions that, when executed by one or more computer processors of a server, cause the server to perform operations comprising:
receiving, from a client device, a content identifier captured by an optical sensor of the client device, and a template selected by a user of the client device, the template corresponding to an interactive feature;
generating, based on the template and the content identifier, a content dataset;
providing the content data set to the client device, wherein the client device uses the content dataset to display a three-dimensional virtual object that provides the interactive feature on a display of the client device over a real-time image of the content identifier captured by the optical sensor of the client device.

16. The non-transitory computer-readable medium of claim 15, wherein the content identifier is a two-dimensional image of a physical object and the three-dimensional virtual object is of the physical object.

17. The non-transitory computer-readable medium of claim 16, wherein, while the three-dimensional virtual object is in a first state, the interactive feature causes the client device to change the three-dimensional virtual object from the first state to a second state in response to receiving a predetermined interaction from a user of the client device.

18. The non-transitory computer-readable medium of claim 17, wherein, while the three-dimensional virtual object is in the second state, the interactive feature causes the client device to change the three-dimensional virtual object from the second state to the first state in response to receiving a second predetermined interaction from the user of the client device.

19. The non-transitory computer-readable medium of claim 17, wherein changing the three-dimensional virtual object from the first state to the second state comprises causing the three-dimensional virtual object to change from a static state to performing an animation.

20. The non-transitory computer-readable medium of claim 15, wherein the content dataset comprises additional information that the client device presents on the display in conjunction with the real-time image of the content identifier and the three-dimensional virtual object.

* * * * *